US012786983B2

(12) United States Patent
Tang et al.

(10) Patent No.: US 12,786,983 B2
(45) Date of Patent: Nov. 3, 2026

(54) COMMUNICATION METHOD AND COMMUNICATION APPARATUS

(71) Applicant: HUAWEI TECHNOLOGIES CO., LTD., Shenzhen (CN)

(72) Inventors: Zihan Tang, Shenzhen (CN); Mengyao Ma, Shenzhen (CN); Huang Huang, Shenzhen (CN); Jiajin Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 18/804,794

(22) Filed: Aug. 14, 2024

(65) Prior Publication Data

US 2024/0406948 A1 Dec. 5, 2024

Related U.S. Application Data

(63) Continuation of application No. PCT/CN2023/072362, filed on Jan. 16, 2023.

(30) Foreign Application Priority Data

Feb. 15, 2022 (CN) ......................... 202210138922.3

(51) Int. Cl.
*H04W 72/12* (2023.01)
*H04W 28/02* (2009.01)

(52) U.S. Cl.
CPC ....... *H04W 72/12* (2013.01); *H04W 28/0284* (2013.01)

(58) Field of Classification Search
CPC ........ G01S 7/006; G01S 13/08; G01S 13/726; H04W 72/12; H04W 28/0284;
(Continued)

(56) References Cited

U.S. PATENT DOCUMENTS

2004/0162673 A1 8/2004 Murray et al.
2019/0166453 A1* 5/2019 Edge ......................... G01S 5/06
2022/0368379 A1* 11/2022 Tsai ..................... H04B 7/0417

FOREIGN PATENT DOCUMENTS

WO WO-2017166921 A1 * 10/2017 ............ H04W 72/04
WO WO-2018190199 A1 * 10/2018 ............. H04N 19/30

OTHER PUBLICATIONS

Minetto et al., "Cooperative Localization Enhancement through GNSS Raw Data in Vehicular Networks," Paper, Presented at Proceedings of 2021 IEEE Globecom Workshops (GC WKSPS), Dec. 7, 2021, 6 pages.

(Continued)

*Primary Examiner* — Khoa Huynh
(74) *Attorney, Agent, or Firm* — Fish & Richardson P.C.

(57) ABSTRACT

Example communication methods and apparatus are described. In one example method, a terminal device obtains and sends first information, where the first information indicates non-differential information of at least one first target point at a first moment. The terminal device obtains second information and sends the second information, where the second information indicates differential information of at least one second target point, and each of the at least one second target point corresponds to a first target point in the at least one first target point. Differential information of each of the at least one second target point is determined based on non-differential information of the second target point at a second moment, and non-differential information of a corresponding first target point at the first moment, and each of the at least one second target point is a target point sensed by the terminal device at the second moment.

20 Claims, 15 Drawing Sheets

(58) Field of Classification Search
CPC ....... H04W 4/38; H04W 4/027; H04W 4/029; H04W 4/02; H04W 72/1221
See application file for complete search history.

(56) References Cited

OTHER PUBLICATIONS

Extended European Search Report in European Appln. No. 23755653.5, mailed on Apr. 3, 2025, 10 pages.

* cited by examiner

COMMUNICATION METHOD AND COMMUNICATION APPARATUS

CROSS-REFERENCE TO RELATED APPLICATIONS

This application is a continuation of International Application No. PCT/CN2023/072362, filed on Jan. 16, 2023, which claims priority to Chinese Patent Application No. 202210138922.3, filed on Feb. 15, 2022. The disclosures of the aforementioned applications are hereby incorporated by reference in their entireties.

TECHNICAL FIELD

This application relates to the field of communication technologies, and in particular, to a communication method and a communication apparatus.

BACKGROUND

With increasingly rich wireless communication application scenarios and rapid development of semiconductor device technologies, a future terminal device may have a specific sensing capability, and information sensed by the terminal device may be for auxiliary communication and other purposes. For example, the information sensed by the terminal device is for assisting in environment imaging, environment rebuilding, beamforming, and the like.

Currently, in an ambient environment of a wireless communication device, each target point continuously moves with time. Therefore, position information of each target point also constantly changes at different moments. The terminal device may sense a position of each target point in the ambient environment at each moment, and report position information of the terminal device at each moment to a base station.

However, in the foregoing technical solution, the terminal device reports, to the base station, the position information of the target point sensed at each moment. Consequently, an amount of data reported by the terminal device is large, and signaling overheads are high. Therefore, how the terminal device reports, by using lower signaling overheads, information about the target point sensed by the terminal device is an urgent problem to be resolved.

SUMMARY

This application provides a communication method and a communication apparatus, to reduce an amount of data reported by a terminal device and reduce signaling overheads.

A first aspect of this application provides a communication method, including:

A terminal device obtains first information, where the first information indicates non-differential information of at least one first target point at a first moment, and the at least one first target point is a target point sensed by the terminal device at the first moment; the terminal device sends the first information to a network device; the terminal device obtains second information, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the terminal device at the second moment; and the terminal device sends the second information to the network device.

In the foregoing technical solution, the terminal device reports the differential information of the at least one second target point sensed at the second moment, and the differential information of each of the at least one second target point is determined based on the non-differential information of the second target point at the second moment and the non-differential information, at the first moment, of the first target point corresponding to the second target point. Compared with a solution in which the terminal device reports non-differential information of a target point sensed at each moment to the network device, the solution in which the terminal device reports the differential information of the at least one second target point reduces an amount of reported data, and reduces signaling overheads. In other words, the terminal device reports the differential information of the at least one second target point to the network device, which helps improve accuracy of the differential information reported by the terminal device when signaling overheads are fixed, thereby indirectly improving accuracy of obtaining the non-differential information of the at least one second target point by the network device.

In a possible implementation method, the method further includes:

The terminal device sends third information to the network device, where the third information indicates a quantity of target points included in the at least one second target point and indicates the first target point corresponding to each of the at least one second target point.

In this implementation, the terminal device further reports the third information, to indicate the quantity of target points included in the at least one second target point and indicate the first target point corresponding to each of the at least one second target point. Therefore, the network device determines the quantity of the at least one second target point and the first target point corresponding to each second target point. In this way, the network device can determine a specific first target point whose non-differential information at the first moment is used as reference differential information to determine the differential information of each second target point. Therefore, the network device determines the non-differential information of the at least one second target point at the second moment based on the second information and the first information.

In another possible implementation, the third information is a bitmap, a quantity of bits included in the bitmap is equal to a quantity of the at least one first target point, and the bits in the bitmap are in one-to-one correspondence with the at least one first target point according to an indication sequence in which the first information indicates the non-differential information of the at least one first target point; and

- a bit whose value is 1 in the bitmap indicates that a first target point corresponding to the bit has a corresponding second target point, the second information indicates the differential information of the at least one second target point in a first sequence, and the first sequence is a sequence of second target points separately corresponding to first target points corresponding to bits whose values are 1 in the bitmap; or
- a bit whose value is 0 in the bitmap indicates that a first target point corresponding to the bit has a corresponding second target point, the second information indicates the differential information of the at least one second target point in a second sequence, and the second sequence is a sequence of second target points separately corresponding to first target points corresponding to bits whose values are 0 in the bitmap.

In this implementation, an implementation in which the quantity of target points included in the at least one second target point and the first target point corresponding to each of the at least one second target point are indicated by using the bitmap is provided. First, the quantity of first target points is represented by using a quantity of bits whose values are 1 or 0 in the bitmap. Then, the non-differential information indicated by the first information and differential information indicated by the second information are associated by using the bitmap. Therefore, the network device determines the non-differential information of the at least one second target point at the second moment.

In another possible implementation, the method further includes:

The terminal device sends fourth information to the network device, where the fourth information indicates the quantity of target points included in the at least one first target point.

In this implementation, the terminal device indicates, to the network device, the quantity of target points included in the at least one first target point, so that the network device reads the first information, to obtain the non-differential information of the at least one first target point at the first moment. On the other hand, the terminal device may further flexibly select a reported quantity of first target points based on an actual requirement and an actual situation. For example, when there are a small quantity of resources, to ensure accuracy of reported information, the terminal device may select a small quantity of first target points, and report non-differential information of the selected first target points at the first moment.

In another possible implementation, the differential information of the at least one second target point includes differential position information of each of the at least one second target point, and the differential position information of each of the at least one second target point includes a coordinate position difference between a coordinate position of the second target point at the second moment and a coordinate position, at the first moment, of the first target point corresponding to the second target point.

In this implementation, a specific scenario to which this application is applicable is shown, to report position information and differential position information of a target point, to reduce an amount of reported data in a position information reporting scenario, and reduce signaling overheads.

In another possible implementation, the method further includes:

The terminal device sends fifth information to the network device, where the fifth information indicates non-differential information of at least one third target point at the second moment, the at least one third target point is a target point sensed by the terminal device at the second moment, and the at least one third target point does not correspond to the at least one first target point.

In this implementation, if the at least one third target point that does not correspond to the first target point exists in the target point sensed by the terminal device at the second moment, the terminal device may further report the fifth information, where the fifth information indicates the non-differential information of the at least one third target point at the second moment.

In another possible implementation, the not corresponding includes:

the at least one third target point does not match the at least one first target point, and/or an absolute value of a differential value in differential information corresponding to the at least one third target point is greater than a first threshold.

In this implementation, some possible implementations in which the at least one third target point does not correspond to the at least one first target point are shown. For example, the at least one third target point does not match the at least one first target point. This may be specifically determined by using a pairing algorithm, for example, a minimum weight matching algorithm or a greedy algorithm. The absolute value of the differential value in the differential information corresponding to the at least one third target point is greater than the first threshold. If the differential value is excessively large, a manner of reporting the differential value is not necessary, and a non-differential value may be directly reported.

In another possible implementation, the first moment and the second moment are a same moment.

In this implementation, for target points sensed by the terminal device at a same moment, non-differential information is reported for a part of target points, and differential information is reported for the other part of target points, where the differential information is determined based on non-differential information of the other part of target points at the first moment and non-differential information of the part of target points at the first moment. Therefore, an amount of data reported by the terminal device is reduced, and signaling overheads are reduced.

In another possible implementation, the method further includes:

The terminal device receives first indication information and/or second indication information from the network device, where the first indication information indicates the terminal device to send the first information, and the second indication information indicates the terminal device to send the second information and/or the fifth information. In this implementation, the terminal device may receive indication information of the network device, and report corresponding information based on the indication information.

In another possible implementation, the method further includes:

The terminal device sends sixth information to the network device, where the sixth information indicates first quantization accuracy of the non-differential information of the at least one first target point.

In this implementation, the terminal device may report, to the network device, quantization accuracy indicating the non-differential information of the at least one first target point, so that the network device determines the non-differential information of the at least one first target point. On the other hand, the terminal device may select appropriate quantization accuracy based on an actual requirement, and indicate the non-differential information of the at least one first target point based on the quantization accuracy.

In another possible implementation, the method further includes:

The terminal device sends seventh information to the network device, where the seventh information indicates second quantization accuracy of the differential information of the at least one second target point.

In this implementation, the terminal device may report, to the network device, the second quantization accuracy indicating the differential information of the at least one second target point, so that the network device determines the differential information of the at least one second target point. On the other hand, the terminal device may select appropriate quantization accuracy based on an actual requirement, and indicate the differential information of the at least one second target point based on the quantization accuracy.

In another possible implementation, the method further includes:

The terminal device determines, according to a pairing algorithm, a target point that is paired with the first target point and a target point that is not paired with the first target point in the target point sensed by the terminal device at the second moment; and the terminal device uses, as the at least one second target point, a target point that is in the target point paired with the first target point and that corresponds to differential information in which an absolute value of a differential value is less than the first threshold, and uses, as the at least one third target point, the target point that is not paired with the first target point and a target point that is in the target point paired with the first target point and that corresponds to differential information in which an absolute value of a differential value is greater than the first threshold.

In this implementation, a process in which the terminal device determines the at least one second target point and the at least one third target point is provided. In this way, it is convenient to determine, by using the non-differential information of the first target point, differential information of the second target point corresponding to the first target point, and report the differential information. Therefore, an amount of data reported by the terminal device is reduced, and signaling overheads are reduced.

In another possible implementation, the first information further includes a first flag bit, the second indication information further includes a second flag bit, a value of the first flag bit is the same as a value of the second flag bit, and the value of the second flag bit indicates that the network device successfully receives the first information.

In this implementation, the terminal device includes a flag bit in information fed back to the network device. The network device receives the information fed back by the terminal device. The network device adds a flag bit to the indication information based on an information receiving status of the network device, and indicates the information receiving status of the network device to the terminal device by using a value of the flag bit. This helps the terminal device select appropriate differential information or non-differential information as reference non-differential information of to-be-reported differential information.

In another possible implementation, if the network device fails in receiving the second information or fails in decoding the second information, the method further includes:

The terminal device receives third indication information from the network device, where the third indication information indicates the terminal device to send tenth information, the tenth information indicates non-differential information of at least one fourth target point at a third moment, and the at least one fourth target point is a target point sensed by the terminal device at the third moment; and the terminal device sends the tenth information to the network device.

In this implementation, if the network device fails in receiving the second information or fails in decoding the second information, the network device may indicate the terminal device to send the non-differential information, to reduce a probability that the network device incorrectly parses differential information subsequently reported by the terminal device due to a failure in decoding the second information by the network device or a packet loss of the second information, and avoid an error propagation effect.

In another possible implementation, the second information further includes a third flag bit, and a value of the third flag bit is different from a value of the first flag bit.

If the network device fails in receiving the second information or fails in decoding the second information, the method further includes:

The terminal device receives fourth indication information from the network device, where the fourth indication information includes a fourth flag bit, a value of the fourth flag bit is different from the value of the third flag bit, the value of the fourth flag bit indicates that the network device fails in receiving the second information or fails in decoding the second information, the fourth indication information indicates the terminal device to send eleventh information, the eleventh information indicates differential information of at least one fourth target point at a third moment, and the differential information of the at least one fourth target point at the third moment is determined based on the non-differential information of the at least one first target point at the first moment and non-differential information of the at least one fourth target point at the third moment. The terminal device sends the eleventh information to the network device.

In this implementation, if the network device fails in receiving the second information or fails in decoding the second information, the network device may indicate the terminal device to send the eleventh information. The differential information of the at least one fourth target point at the third moment is determined based on the non-differential information of the at least one first target point at the first moment and the non-differential information of the at least one fourth target point at the third moment. Therefore, an amount of data reported by the terminal device is reduced, and signaling overheads are reduced.

In another possible implementation, the method further includes:

The terminal device receives first configuration information from the network device, where the first configuration information indicates the terminal device to send, based on a first cycle and starting from a first moment, non-differential information of a target point sensed by the terminal device at different moments, and send, based on a second cycle and starting from a second moment, differential information of the target point sensed by the terminal device at different moments. The second cycle is shorter than the first cycle.

That the terminal device sends the first information to a network device includes:

The terminal device updates the first information based on the first cycle, and sends updated first information to the network device.

That the terminal device sends the second information to the network device includes:

The terminal device updates the second information based on the second cycle, and sends updated second information to the network device.

In this implementation, the network device schedules, in a semi-persistent scheduling manner, the terminal device to report the first information and the second information, and the terminal device reports, based on the first cycle, the non-differential information of the target point sensed by the terminal device at different moments, and reports, based on the second cycle, the non-differential information of the target point sensed by the terminal device at different moments. Therefore, an amount of data reported is reduced, and signaling overheads are reduced.

A second aspect of this application provides a communication method, including:

A network device receives first information from a terminal device, where the first information indicates non-differential information of at least one first target point at a first moment, and the at least one first target point is a target point sensed by the terminal device at the first moment; the network device receives second information from the terminal device, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the terminal device at the second moment; and the network device determines non-differential information of the at least one second target point at the second moment based on the first information and the second information.

In the foregoing technical solution, the network device determines the non-differential information of the at least one second target point at the second moment based on the first information and the second information. The second information indicates the differential information of the at least one second target point, and the differential information of each of the at least one second target point is determined based on the non-differential information of the second target point at the second moment and the non-differential information, at the first moment, of the first target point corresponding to the second target point. Compared with a solution in which the terminal device reports non-differential information of a target point sensed at each moment to the network device, the solution in which the terminal device reports the differential information of the at least one second target point reduces an amount of reported data, and reduces signaling overheads. In other words, the terminal device reports the differential information of the at least one second target point to the network device, which helps improve accuracy of the differential information reported by the terminal device when signaling overheads are fixed, thereby indirectly improving accuracy of obtaining the non-differential information of the at least one second target point by the network device.

In a possible implementation, that the network device determines non-differential information of the at least one second target point at the second moment based on the first information and the second information includes:

The network device determines the non-differential information of the at least one first target point at the first moment based on the first information; the network device determines the differential information of the at least one second target point based on the second information; and the network device determines the non-differential information of the at least one second target point at the second moment based on the non-differential information of the at least one first target point at the first moment and the differential information of the at least one second target point.

In this implementation, a specific process in which the network device determines the non-differential information of the at least one second target point at the second moment based on the first information and the second information is provided, thereby facilitating implementation of the solution.

In another possible implementation, the method further includes:

The network device receives third information from the terminal device, where the third information indicates a quantity of target points included in the at least one second target point and indicates the first target point corresponding to each of the at least one second target point.

That the network device determines non-differential information of the at least one second target point at the second moment based on the first information and the second information includes: The network device determines the non-differential information of the at least one second target point at the second moment based on the first information, the second information, and the third information.

In this implementation, the network device may first determine, based on the third information, the quantity of target points included in the at least one second target point and the first target point corresponding to each of the at least one second target point. In this way, the network device can determine a specific first target point whose non-differential information at the first moment is used as reference differential information to determine the differential information of each second target point. Therefore, the network device determines the non-differential information of the at least one second target point at the second moment based on the second information and the first information.

In another possible implementation, the third information is a bitmap, a quantity of bits included in the bitmap is equal to a quantity of the at least one first target point, and the bits in the bitmap are in one-to-one correspondence with the at least one first target point according to an indication sequence in which the first information indicates the non-differential information of the at least one first target point; and

- a bit whose value is 1 in the bitmap indicates that a first target point corresponding to the bit has a corresponding second target point, the second information indicates the differential information of the at least one second target point in a first sequence, and the first sequence is a sequence of second target points separately corresponding to first target points corresponding to bits whose values are 1 in the bitmap; or
- a bit whose value is 0 in the bitmap indicates that a first target point corresponding to the bit has a corresponding second target point, the second information indicates the differential information of the at least one second target point in a second sequence, and the second sequence is a sequence of second target points separately corresponding to first target points corresponding to bits whose values are 0 in the bitmap.

In this implementation, an implementation in which the quantity of target points included in the at least one second target point and the first target point corresponding to each of the at least one second target point are indicated by using the bitmap is provided. First, the quantity of first target points is represented by using a quantity of bits whose values are 1 or 0 in the bitmap. Then, the non-differential information indicated by the first information and differential information indicated by the second information are associated by using the bitmap. Therefore, the network device determines the non-differential information of the at least one second target point at the second moment.

In another possible implementation, the method further includes:

The network device receives fourth information from the terminal device, where the fourth information indicates the quantity of target points included in the at least one first target point.

That the network device determines non-differential information of the at least one second target point at the second moment based on the first information and the second information includes: The network device determines the non-differential information of the at least one second target point at the second moment based on the first information, the second information, and the fourth information.

In this implementation, the network device receives the fourth information from the terminal device, where the fourth information indicates the quantity of target points included in the at least one first target point, so that the network device reads the first information, to obtain the non-differential information of the at least one first target point at the first moment. On the other hand, the terminal device may further flexibly select a reported quantity of first target points based on an actual requirement and an actual situation. For example, when there are a small quantity of resources, to ensure accuracy of reported information, the terminal device may select a small quantity of first target points, and report non-differential information of the selected first target points at the first moment.

In another possible implementation, the differential information of the at least one second target point includes differential position information of each of the at least one second target point, and the differential position information of each of the at least one second target point includes a coordinate position difference between a coordinate position of the second target point at the second moment and a coordinate position, at the first moment, of the first target point corresponding to the second target.

In this implementation, a specific scenario to which this application is applicable is shown, to report position information and differential position information of a target point, to reduce an amount of reported data in a position information reporting scenario, and reduce signaling overheads.

In another possible implementation, the method further includes:

The network device receives fifth information from the terminal device, where the fifth information indicates non-differential information of at least one third target point at the second moment, the at least one third target point is a target point sensed by the terminal device at the second moment, and the at least one third target point does not correspond to the at least one first target point.

In this implementation, if the at least one third target point that does not correspond to the first target point exists in the target point sensed by the terminal device at the second moment, the terminal device may further report the fifth information, where the fifth information indicates the non-differential information of the at least one third target point at the second moment.

In another possible implementation, the not corresponding includes:

the at least one third target point does not match the at least one first target point, and/or an absolute value of a differential value in differential information corresponding to the at least one third target point is greater than a first threshold.

In this implementation, some possible implementations in which the at least one third target point does not correspond to the at least one first target point are shown. For example, the at least one third target point does not match the at least one first target point. This may be specifically determined by using a pairing algorithm, for example, a minimum weight matching algorithm or a greedy algorithm. The absolute value of the differential value in the differential information corresponding to the at least one third target point is greater than the first threshold. If the differential value is excessively large, a manner of reporting the differential value is not necessary, and a non-differential value may be directly reported.

In another possible implementation, the first moment and the second moment are a same moment.

In this implementation, for target points sensed by the terminal device at a same moment, non-differential information is reported for a part of target points, and differential information is reported for the other part of target points, where the differential information is determined based on non-differential information of the other part of target points at the first moment and non-differential information of the part of target points at the first moment. Therefore, an amount of data reported by the terminal device is reduced, and signaling overheads are reduced.

In another possible implementation, the method further includes:

The network device sends first indication information and/or second indication information to the terminal device, where the first indication information indicates the terminal device to send the first information, and the second indication information indicates the terminal device to send the second information and/or the fifth information. In this implementation, the terminal device may receive indication information of the network device, and report corresponding information based on the indication information.

In another possible implementation, the method further includes:

The network device receives sixth information from the terminal device, where the sixth information indicates first quantization accuracy of the non-differential information of the at least one first target point.

That the network device determines non-differential information of the at least one second target point at the second moment based on the first information and the second information includes:

The network device determines the non-differential information of the at least one second target point at the second moment based on the first information, the second information, and the sixth information.

In this implementation, the network device receives the sixth information from the terminal device, where the sixth information indicates the quantization accuracy of the non-differential information of the at least one first target point. Therefore, the network device determines the non-differential information of the at least one first target point. On the other hand, the terminal device may select appropriate quantization accuracy based on an actual requirement, and indicate the non-differential information of the at least one first target point based on the quantization accuracy.

In another possible implementation, the method further includes:

The network device receives seventh information from the terminal device, where the seventh information indicates second quantization accuracy of the differential information of the at least one second target point.

That the network device determines non-differential information of the at least one second target point at the second moment based on the first information and the second information includes:

The network device determines the non-differential information of the at least one second target point at the second moment based on the first information, the second information, and the seventh information.

In this implementation, the network device receives the seventh information from the terminal device, where the seventh information indicates the second quantization accuracy of the differential information of the at least one second target point, so that the network device determines the differential information of the at least one second target point. On the other hand, the terminal device may select appropriate quantization accuracy based on an actual requirement, and indicate the differential information of the at least one second target point based on the quantization accuracy.

In another possible implementation, the first information further includes a first flag bit, the second indication information further includes a second flag bit, a value of the first flag bit is the same as a value of the second flag bit, and the value of the second flag bit indicates that the network device successfully receives the first information.

In this implementation, the terminal device includes a flag bit in information fed back to the network device. The network device receives the information fed back by the terminal device. The network device adds a flag bit to the indication information based on an information receiving status of the network device, and indicates the information receiving status of the network device to the terminal device by using a value of the flag bit. This helps the terminal device select appropriate differential information or non-differential information as reference non-differential information of to-be-reported differential information.

In another possible implementation, if the network device fails in receiving the second information or fails in decoding the second information, the method further includes:

The network device sends third indication information to the terminal device, where the third indication information indicates the terminal device to send tenth information, the tenth information indicates non-differential information of at least one fourth target point at a third moment, and the at least one fourth target point is a target point sensed by the terminal device at the third moment; and the network device receives the tenth information from the terminal device.

In this implementation, if the network device fails in receiving the second information or fails in decoding the second information, the network device may indicate the terminal device to send the non-differential information, to reduce a probability that the network device incorrectly parses differential information subsequently reported by the terminal device due to a failure in decoding the second information by the network device or a packet loss of the second information, and avoid an error propagation effect.

In another possible implementation, the second information further includes a third flag bit, and a value of the third flag bit is different from a value of the first flag bit.

If the network device fails in receiving the second information or fails in decoding the second information, the method further includes:

The network device sends fourth indication information to the terminal device, where the fourth indication information includes a fourth flag bit, a value of the fourth flag bit is different from the value of the third flag bit, the value of the fourth flag bit indicates that the network device fails in receiving the second information or fails in decoding the second information, the fourth indication information indicates the terminal device to send eleventh information, the eleventh information indicates differential information of at least one fourth target point at a third moment, and the differential information of the at least one fourth target point at the third moment is determined based on the non-differential information of the at least one first target point at the first moment and non-differential information of the at least one fourth target point at the third moment. The network device receives the eleventh information from the terminal device.

In this implementation, if the network device fails in receiving the second information or fails in decoding the second information, the network device may indicate the terminal device to send the eleventh information. The differential information of the at least one fourth target point at the third moment is determined based on the non-differential information of the at least one first target point at the first moment and the non-differential information of the at least one fourth target point at the third moment. Therefore, an amount of data reported by the terminal device is reduced, and signaling overheads are reduced.

In another possible implementation, the method further includes:

The network device sends first configuration information to the terminal device, where the first configuration information indicates the terminal device to send, based on a first cycle and starting from a first moment, non-differential information of a target point sensed by the terminal device at different moments, and send, based on a second cycle and starting from a second moment, differential information of the target point sensed by the terminal device at different moments. The second cycle is shorter than the first cycle.

In this implementation, the network device schedules, in a semi-persistent scheduling manner, the terminal device to report the first information and the second information. In this way, the terminal device can report, based on the first cycle, the non-differential information of the target point sensed by the terminal device at different moments, and report, based on the second cycle, the non-differential information of the target point sensed by the terminal device at different moments. Therefore, an amount of data reported is reduced, and signaling overheads are reduced.

A third aspect of this application provides a communication apparatus, including:

- a processing module, configured to obtain first information, where the first information indicates non-differential information of at least one first target point at a first moment, and the at least one first target point is a target point sensed by the communication apparatus at the first moment; and
- a transceiver module, configured to send the first information to a network device.

The processing module is further configured to obtain second information, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the communication apparatus at the second moment.

The transceiver module is further configured to send the second information to the network device.

In a possible implementation method, the transceiver module is further configured to:

- send third information to the network device, where the third information indicates a quantity of target points included in the at least one second target point and indicates the first target point corresponding to each of the at least one second target point.

In another possible implementation, the third information is a bitmap, a quantity of bits included in the bitmap is equal to a quantity of the at least one first target point, and the bits in the bitmap are in one-to-one correspondence with the at least one first target point according to an indication sequence in which the first information indicates the non-differential information of the at least one first target point; and a bit whose value is 1 in the bitmap indicates that a first target point corresponding to the bit has a corresponding second target point, the second information indicates the differential information of the at least one second target point in a first sequence, and the first sequence is a sequence of second target points separately corresponding to first target points corresponding to bits whose values are 1 in the bitmap; or a bit whose value is 0 in the bitmap indicates that a first target point corresponding to the bit has a corresponding second target point, the second information indicates the differential information of the at least one second target point in a second sequence, and the second sequence is a sequence of second target points separately corresponding to first target points corresponding to bits whose values are 0 in the bitmap.

In another possible implementation, the transceiver module is further configured to:

send fourth information to the network device, where the fourth information indicates the quantity of target points included in the at least one first target point.

In another possible implementation, the differential information of the at least one second target point includes differential position information of each of the at least one second target point, and the differential position information of each of the at least one second target point includes a coordinate position difference between a coordinate position of the second target point at the second moment and a coordinate position, at the first moment, of the first target point corresponding to the second target point.

In another possible implementation, the transceiver module is further configured to:

send fifth information to the network device, where the fifth information indicates non-differential information of at least one third target point at the second moment, the at least one third target point is a target point sensed by the communication apparatus at the second moment, and the at least one third target point does not correspond to the at least one first target point.

In another possible implementation, the not corresponding includes:

the at least one third target point does not match the at least one first target point, and/or an absolute value of a differential value in differential information corresponding to the at least one third target point is greater than a first threshold.

In another possible implementation, the first moment and the second moment are a same moment.

In another possible implementation, the transceiver module is further configured to:

receive first indication information and/or second indication information from the network device, where the first indication information indicates the communication apparatus to send the first information, and the second indication information indicates the communication apparatus to send the second information and/or the fifth information.

In another possible implementation, the transceiver module is further configured to:

sending sixth information to the network device, where the sixth information indicates first quantization accuracy of the non-differential information of the at least one first target point.

In another possible implementation, the transceiver module is further configured to: sending seventh information to the network device, where the seventh information indicates second quantization accuracy of the differential information of the at least one second target point.

In another possible implementation, the processing module is further configured to:

determine, according to a pairing algorithm, a target point that is paired with the first target point and a target point that is not paired with the first target point in the target point sensed by the communication apparatus at the second moment; and use, as the at least one second target point, a target point that is in the target point paired with the first target point and that corresponds to differential information in which an absolute value of a differential value is less than the first threshold, and use, as the at least one third target point, the target point that is not paired with the first target point and a target point that is in the target point paired with the first target point and that corresponds to differential information in which an absolute value of a differential value is greater than the first threshold.

In another possible implementation, the first information further includes a first flag bit, the second indication information further includes a second flag bit, a value of the first flag bit is the same as a value of the second flag bit, and the value of the second flag bit indicates that the network device successfully receives the first information.

In another possible implementation, if the network device fails in receiving the second information or fails in decoding the second information, the transceiver module is further configured to:

receive third indication information from the network device, where the third indication information indicates the communication apparatus to send tenth information, the tenth information indicates non-differential information of at least one fourth target point at a third moment, and the at least one fourth target point is a target point sensed by the communication apparatus at the third moment; and send the tenth information to the network device.

In another possible implementation, the second information further includes a third flag bit, and a value of the third flag bit is different from a value of the first flag bit.

If the network device fails in receiving the second information or fails in decoding the second information, the transceiver module is further configured to:

receive fourth indication information from the network device, where the fourth indication information includes a fourth flag bit, a value of the fourth flag bit is different from the value of the third flag bit, the value of the fourth flag bit indicates that the network device fails in receiving the second information or fails in decoding the second information, the fourth indication information indicates the communication apparatus to send eleventh information, the eleventh information indicates differential information of at least one fourth target point at a third moment, and the differential information of the at least one fourth target point at the third moment is determined based on the non-differential information of the at least one first target point at the first moment and non-differential information of the at least one fourth target point at the third moment; and send the eleventh information to the network device.

In another possible implementation, the transceiver module is further configured to:

receive first configuration information from the network device, where the first configuration information indicates the communication apparatus to send, based on a first cycle and starting from a first moment, non-differential information of a target point sensed by the communication apparatus at different moments, and send, based on a second cycle and starting from a second moment, differential information of the target point sensed by the communication apparatus at different moments. The second cycle is shorter than the first cycle.

The transceiver module is specifically configured to:

update the first information based on the first cycle, and send updated first information to the network device; and update the second information based on the second cycle, and send updated second information to the network device.

For a technical effect brought by the third aspect, refer to the technical effect brought by the first aspect. For a technical effect brought by any possible implementation of the third aspect, refer to the technical effect brought by any possible implementation of the first aspect. Details are not described herein again.

A fourth aspect of this application provides a communication apparatus, including:

a transceiver module, configured to receive first information from a terminal device, where the first information indicates non-differential information of at least one first target point at a first moment, and the at least one first target point is a target point sensed by the terminal device at the first moment; and receive second information from the terminal device, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the terminal device at the second moment; and a processing module, configured to determine non-differential information of the at least one second target point at the second moment based on the first information and the second information.

In a possible implementation, the processing module is specifically configured to:

determine the non-differential information of the at least one first target point at the first moment based on the first information;

determine the differential information of the at least one second target point based on the second information; and determine the non-differential information of the at least one second target point at the second moment based on the non-differential information of the at least one first target point at the first moment and the differential information of the at least one second target point.

In another possible implementation, the transceiver module is further configured to:

receive third information from the terminal device, where the third information indicates a quantity of target points included in the at least one second target point and indicates the first target point corresponding to each of the at least one second target point.

The processing module is specifically configured to:

determine the non-differential information of the at least one second target point at the second moment based on the first information, the second information, and the third information.

In another possible implementation, the third information is a bitmap, a quantity of bits included in the bitmap is equal to a quantity of the at least one first target point, and the bits in the bitmap are in one-to-one correspondence with the at least one first target point according to an indication sequence in which the first information indicates the non-differential information of the at least one first target point; and a bit whose value is 1 in the bitmap indicates that a first target point corresponding to the bit has a corresponding second target point, the second information indicates the differential information of the at least one second target point in a first sequence, and the first sequence is a sequence of second target points separately corresponding to first target points corresponding to bits whose values are 1 in the bitmap; or a bit whose value is 0 in the bitmap indicates that a first target point corresponding to the bit has a corresponding second target point, the second information indicates the differential information of the at least one second target point in a second sequence, and the second sequence is a sequence of second target points separately corresponding to first target points corresponding to bits whose values are 0 in the bitmap.

In another possible implementation, the transceiver module is further configured to:

receive fourth information from the terminal device, where the fourth information indicates the quantity of target points included in the at least one first target point.

The processing module is specifically configured to:

determine the non-differential information of the at least one second target point at the second moment based on the first information, the second information, and the fourth information.

In another possible implementation, the differential information of the at least one second target point includes differential position information of each of the at least one second target point, and the differential position information of each of the at least one second target point includes a coordinate position difference between a coordinate position of the second target point at the second moment and a coordinate position, at the first moment, of the first target point corresponding to the second target.

In another possible implementation, the transceiver module is further configured to:

receive fifth information from the terminal device, where the fifth information indicates non-differential information of at least one third target point at the second moment, the at least one third target point is a target point sensed by the terminal device at the second moment, and the at least one third target point does not correspond to the at least one first target point.

In another possible implementation, the not corresponding includes:

the at least one third target point does not match the at least one first target point, and/or an absolute value of a differential value in differential information corresponding to the at least one third target point is greater than a first threshold.

In another possible implementation, the first moment and the second moment are a same moment.

In another possible implementation, the transceiver module is further configured to:

send first indication information and/or second indication information to the terminal device, where the first indication information indicates the terminal device to send the first information, and the second indication information indicates the terminal device to send the second information and/or the fifth information.

In another possible implementation, the transceiver module is further configured to:

receive sixth information from the terminal device, where the sixth information indicates first quantization accuracy of the non-differential information of the at least one first target point.

The processing module is specifically configured to:

determine the non-differential information of the at least one second target point at the second moment based on the first information, the second information, and the sixth information.

In another possible implementation, the transceiver module is further configured to:

receive seventh information from the terminal device, where the seventh information indicates second quantization accuracy of the differential information of the at least one second target point.

The processing module is specifically configured to:

determine the non-differential information of the at least one second target point at the second moment based on the first information, the second information, and the seventh information.

In another possible implementation, the first information further includes a first flag bit, the second indication information further includes a second flag bit, a value of the first flag bit is the same as a value of the second flag bit, and the value of the second flag bit indicates that the communication apparatus successfully receives the first information.

In another possible implementation, if the communication apparatus fails in receiving the second information or fails in decoding the second information, the transceiver module is further configured to:

send third indication information to the terminal device, where the third indication information indicates the terminal device to send tenth information, the tenth information indicates non-differential information of at least one fourth target point at a third moment, and the at least one fourth target point is a target point sensed by the terminal device at the third moment; and receive the tenth information from the terminal device.

In another possible implementation, the second information further includes a third flag bit, and a value of the third flag bit is different from a value of the first flag bit.

If the communication apparatus fails in receiving the second information or fails in decoding the second information, the transceiver module is further configured to:

send fourth indication information to the terminal device, where the fourth indication information includes a fourth flag bit, a value of the fourth flag bit is different from the value of the third flag bit, the value of the fourth flag bit indicates that the communication apparatus fails in receiving the second information or fails in decoding the second information, the fourth indication information indicates the terminal device to send eleventh information, the eleventh information indicates differential information of at least one fourth target point at a third moment, and the differential information of the at least one fourth target point at the third moment is determined based on the non-differential information of the at least one first target point at the first moment and non-differential information of the at least one fourth target point at the third moment; and receive the eleventh information from the terminal device.

In another possible implementation, the transceiver module is further configured to:

send first configuration information to the terminal device, where the first configuration information indicates the terminal device to send, based on a first cycle and starting from a first moment, non-differential information of a target point sensed by the terminal device at different moments, and send, based on a second cycle and starting from a second moment, differential information of the target point sensed by the terminal device at different moments. The second cycle is shorter than the first cycle.

For a technical effect brought by the fourth aspect, refer to the technical effect brought by the second aspect. For a technical effect brought by any possible implementation of the fourth aspect, refer to the technical effect brought by any possible implementation of the second aspect. Details are not described herein again.

A fifth aspect of embodiments of this application provides a communication apparatus. The communication apparatus includes a logic circuit and an input/output interface. The logic circuit is configured to perform a processing operation in any implementation of the first aspect, and the input/output interface is configured to perform receiving and sending operations in any implementation of the first aspect.

For example, the communication apparatus is configured to perform the following solution:

The logic circuit is configured to obtain first information, where the first information indicates non-differential information of at least one first target point at a first moment, and the at least one first target point is a target point sensed by the communication apparatus at the first moment.

The input/output interface is configured to send the first information to the network device.

The logic circuit is further configured to obtain second information, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the communication apparatus at the second moment.

The input/output interface is further configured to send the second information to the network device.

For a technical effect brought by the fifth aspect, refer to the technical effect brought by the first aspect. For a technical effect brought by any possible implementation of the fifth aspect, refer to the technical effect brought by any possible implementation of the first aspect. Details are not described herein again.

A sixth aspect of embodiments of this application provides a communication apparatus. The communication apparatus includes a logic circuit and an input/output interface. The logic circuit is configured to perform a processing operation in any implementation of the second aspect, and the input/output interface is configured to perform receiving and sending operations in any implementation of the second aspect.

For example, the communication apparatus is configured to perform the following solution:

The logic circuit is configured to: receive first information from a terminal device, where the first information indicates non-differential information of at least one first target point at a first moment, and the at least one first target point is a target point sensed by the terminal device at the first moment; and receive second information from the terminal device, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the terminal device at the second moment.

The input/output interface is configured to determine non-differential information of the at least one second target point at the second moment based on the first information and the second information.

For a technical effect brought by the sixth aspect, refer to the technical effect brought by the second aspect. For a technical effect brought by any possible implementation of the sixth aspect, refer to the technical effect brought by any possible implementation of the second aspect. Details are not described herein again.

A seventh aspect of this application provides a communication apparatus. The communication apparatus includes a processor. The processor is configured to invoke a computer program or computer instructions in a memory, so that the processor implements any implementation of the first aspect.

Optionally, the communication apparatus further includes the memory.

Optionally, the memory and the processor are integrated together.

Optionally, the communication apparatus further includes a transceiver, and the processor is configured to control the transceiver to receive and send signals.

For a technical effect brought by the seventh aspect, refer to the technical effect brought by the first aspect. For a technical effect brought by any possible implementation of the seventh aspect, refer to the technical effect brought by any possible implementation of the first aspect. Details are not described herein again.

An eighth aspect of this application provides a communication apparatus. The communication apparatus includes a processor. The processor is configured to invoke a computer program or computer instructions in a memory, so that the processor implements any implementation of the second aspect.

Optionally, the communication apparatus further includes the memory.

Optionally, the memory and the processor are integrated together.

Optionally, the communication apparatus further includes a transceiver, and the processor is configured to control the transceiver to receive and send signals.

For a technical effect brought by the eighth aspect, refer to the technical effect brought by the second aspect. For a technical effect brought by any possible implementation of the eighth aspect, refer to the technical effect brought by any possible implementation of the second aspect. Details are not described herein again.

A ninth aspect of this application provides a computer program product including instructions. When the computer program product runs on a computer, the computer is enabled to perform any implementation of the first aspect or the second aspect.

A tenth aspect of this application provides a computer-readable storage medium, including computer instructions. When the instructions are run on a computer, the computer is enabled to perform any implementation of the first aspect or the second aspect.

An eleventh aspect of this application provides a chip apparatus, including a processor, configured to invoke a computer program or computer instructions in a memory, so that the processor performs any implementation of the first aspect.

Optionally, the processor is coupled to the memory through an interface.

A twelfth aspect of this application provides a chip apparatus, including a processor, configured to invoke a computer program or computer instructions in a memory, so that the processor performs any implementation of the second aspect.

Optionally, the processor is coupled to the memory through an interface.

A thirteenth aspect of this application provides a communication system, where the communication system includes the terminal device according to the first aspect and the network device according to the second aspect.

According to the foregoing technical solutions, it can be learned that embodiments of this application have the following advantages:

In the foregoing technical solutions, the terminal device obtains the first information, where the first information indicates the non-differential information of the at least one first target point at the first moment, and the at least one first target point is the target point sensed by the terminal device at the first moment. The terminal device sends the first information to the network device. Then, the terminal device obtains the second information, where the second information indicates the differential information of the at least one second target point, each of the at least one second target point corresponds to one first target point, the differential information of each of the at least one second target point is determined based on the non-differential information of the second target point at the second moment and the non-differential information, at the first moment, of the first target point corresponding to the second target point, and the at least one second target point is the target point sensed by the terminal device at the second moment; and the terminal device sends the second information to the network device. It can be learned from the foregoing technical solutions that, the terminal device reports the differential information of the at least one second target point sensed at the second moment, and the differential information of each of the at least one second target point is determined based on the non-differential information of the second target point at the second moment and the non-differential information, at the first moment, of the first target point corresponding to the second target point. Compared with a solution in which the terminal device reports non-differential information of a target point sensed at each moment to the network device, the solution in which the terminal device reports the differential information of the at least one second target point reduces an amount of reported data, and reduces signaling overheads.

DESCRIPTION OF EMBODIMENTS

Embodiments of this application provides a communication method and a communication apparatus, to reduce an amount of data reported by a terminal device and reduce signaling overheads.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

In this application, "at least one" means one or more, and "a plurality of" means two or more. The term "and/or" is an association relationship for describing associated objects and represents that three relationships may exist. For example, A and/or B may represent the following three cases: Only A exists, both A and B exist, and only B exists. A and B may be singular or plural. "At least one of the following items (pieces)" or a similar expression thereof means any combination of these items, including any combination of singular items (pieces) or plural items (pieces). For example, at least one of a, b, or c may represent a, b, c, a and b, a and c, b and c, or a, b, and c, where a, b, and c each may be singular or plural.

A communication system to which the technical solutions provided in this application are applicable includes but is not limited to a 4th generation (4th generation, 4G) communication system, a worldwide interoperability for microwave access (worldwide interoperability for microwave access, WiMAX) communication system, a 5th generation (the fifth-generation, 5G) communication system, a communication system (for example, a 6G communication system) after the 5G communication system, an internet of vehicles communication system, or a device to device (device to device, D2D) communication system. For example, the 4G communication system may be a long term evolution (long term evolution, LTE) system, and the 5G communication system may be a new radio (new radio, NR) system.

Figure 1:
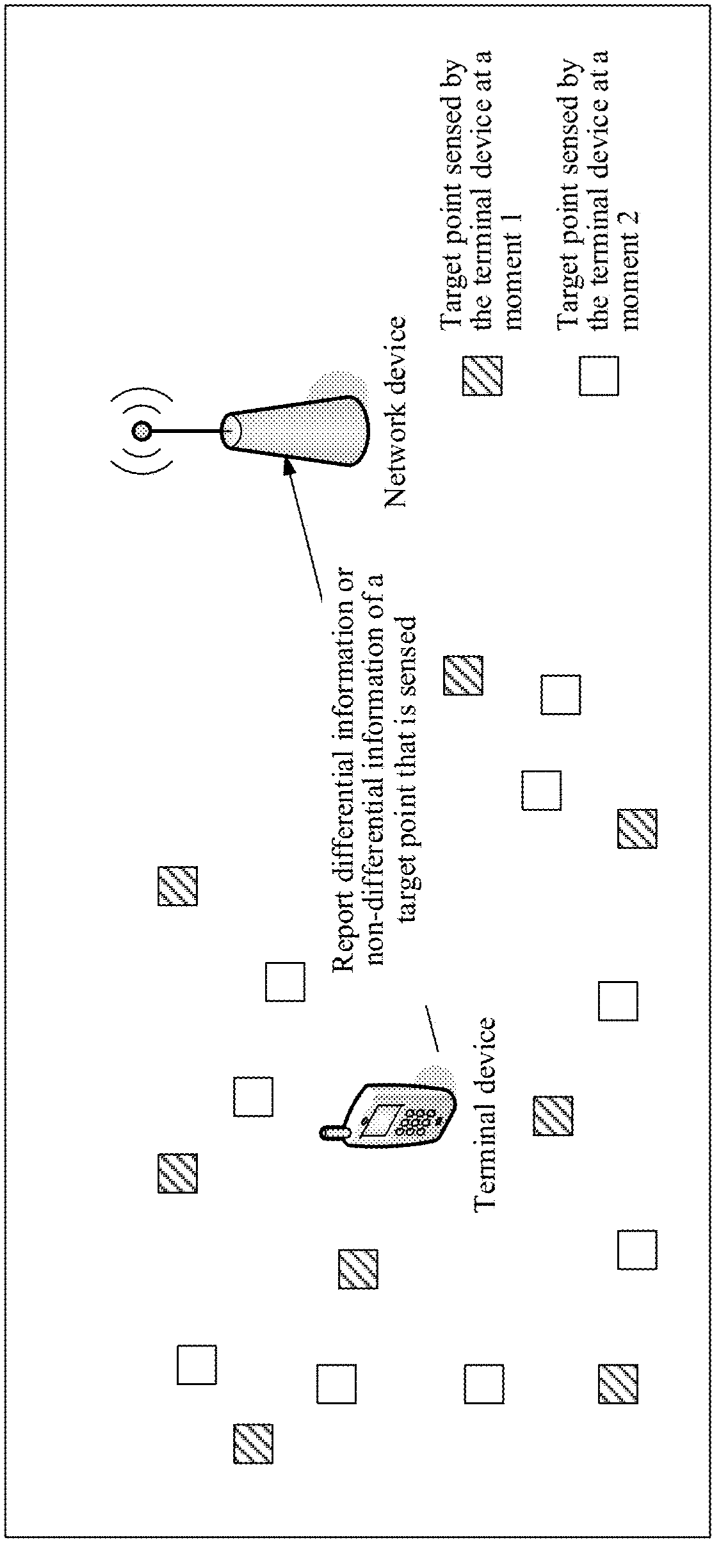
FIG. 1 is a schematic of a communication system according to an embodiment of this application.

FIG. 1 is a schematic of a communication system according to an embodiment of this application. Refer to FIG. 1. The communication system includes a terminal device and a network device. The terminal device may sense non-differential information of a target point in an ambient environment. For example, the non-differential information of the target point includes position information, speed information, phase information, amplitude information, and the like of the target point. This is not specifically limited in this application. For example, the position information includes a coordinate position, a phase coordinate position, and the like of the target point. The speed information includes a moving speed, an acceleration, and the like of the target point. The phase information includes a phase of an echo signal reflected or refracted by the target point. The amplitude information includes an amplitude of the echo signal reflected or refracted by the target point. The echo signal is an echo signal of the target point for a signal transmitted by the terminal device. The following describes the technical solutions of this application by using the position information as an example.

As shown in FIG. 1, the terminal device may sense position information of at least one target point in the ambient environment at a moment 1, and report the position information of the at least one target point at the moment 1 to the network device. Then, the terminal device may sense position information of at least one second target point in the ambient environment at a moment 2, and determine a first target point corresponding to each second target point. The terminal device determines differential position information of each second target point by using position information of the second target point at the moment 2 and position information, at the moment 1, of a first target point corresponding to the second target point. Then, the terminal device reports the differential position information of the second target point to the network device.

The terminal device may be referred to as user equipment (user equipment, UE), an access terminal, a subscriber unit, a subscriber station, a mobile station (mobile station, MS), a mobile console, a remote terminal, a mobile device, a user terminal, a terminal, a wireless communication device, a user apparatus, a vehicle, or the like. The terminal device may be a cellular phone (cellular phone), a smartphone (smartphone), a wireless data card, a personal digital assistant (personal digital assistant, PDA for short) computer, a tablet computer, a wireless modem (modem), a laptop computer (laptop computer), a machine type communication (machine type communication, MTC) device, various handheld devices (handsets) with a wireless communication function, a computer device, a vehicle-mounted device, a wearable device, a computing device, or another processing device connected to a wireless modem; a terminal device in a 5G communication system, a terminal device in an NR system, or a terminal device in a communication system after a 5G network, for example, a terminal device in a future evolved public land mobile network (public land mobile network, PLMN).

For example, the network device is an apparatus deployed in a radio access network (radio access network, RAN) to provide a wireless communication function for the terminal device. The network device may be a base station, and the base station includes a macro base station, a micro base station, a relay station, and an access network point in various forms. For example, the base station in this embodiment of this application may be a base station in NR, a transmission reception point (transmission reception point, TRP) or a transmission point (transmission point, TP), or a next generation NodeB (next generation NodeB, ngNB), may be an evolved NodeB (evolved NodeB, eNB or eNodeB) in an LTE system, or may be a base station in a satellite communication system or a future communication system, such as a high-altitude base station, a low-orbit base station, a device such as a hot air balloon that may provide a wireless access function for the terminal device, an uncrewed aerial vehicle, a low-orbit satellite, a medium-orbit satellite, or a high-orbit satellite. The network device may also be a mobile switching center, a device that undertakes a base station function in device-to-device (Device-to-Device, D2D), vehicle-to-everything (vehicle-to-everything, V2X), or machine-to-machine (machine-to-machine, M2M) communication, or the like. Alternatively, the network device may be a network node that forms a gNB or a transmission point, such as a baseband unit (baseband unit, BBU) or a distributed unit (distributed unit, DU).

In some deployments, the gNB may include a central unit (central unit, CU) and a DU. The gNB may further include an active antenna unit (active antenna unit, AAU). The CU implements some functions of the gNB, and the DU implements some functions of the gNB.

For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and performing functions of a radio link control (radio link control, RLC) layer, a MAC layer, and a physical (physical, PHY) layer.

The AAU implements some physical layer processing functions, radio frequency processing, and a function related to an active antenna. The information at the RRC layer is finally changed to the information at the PHY layer, or is changed from the information at the PHY layer. Therefore, in this architecture, the higher layer signaling (for example, the RRC layer signaling) may also be considered to be sent by the DU, or sent by the DU and the AAU.

It may be understood that the network device may be a device including one or more of a CU node, a DU node, and an AAU node. In addition, the CU may be classified as a network device in the RAN, or a network device in a core network (core network, CN). This is not limited in this application.

The technical solutions of this application are described below with reference to specific embodiments.

Figure 2:
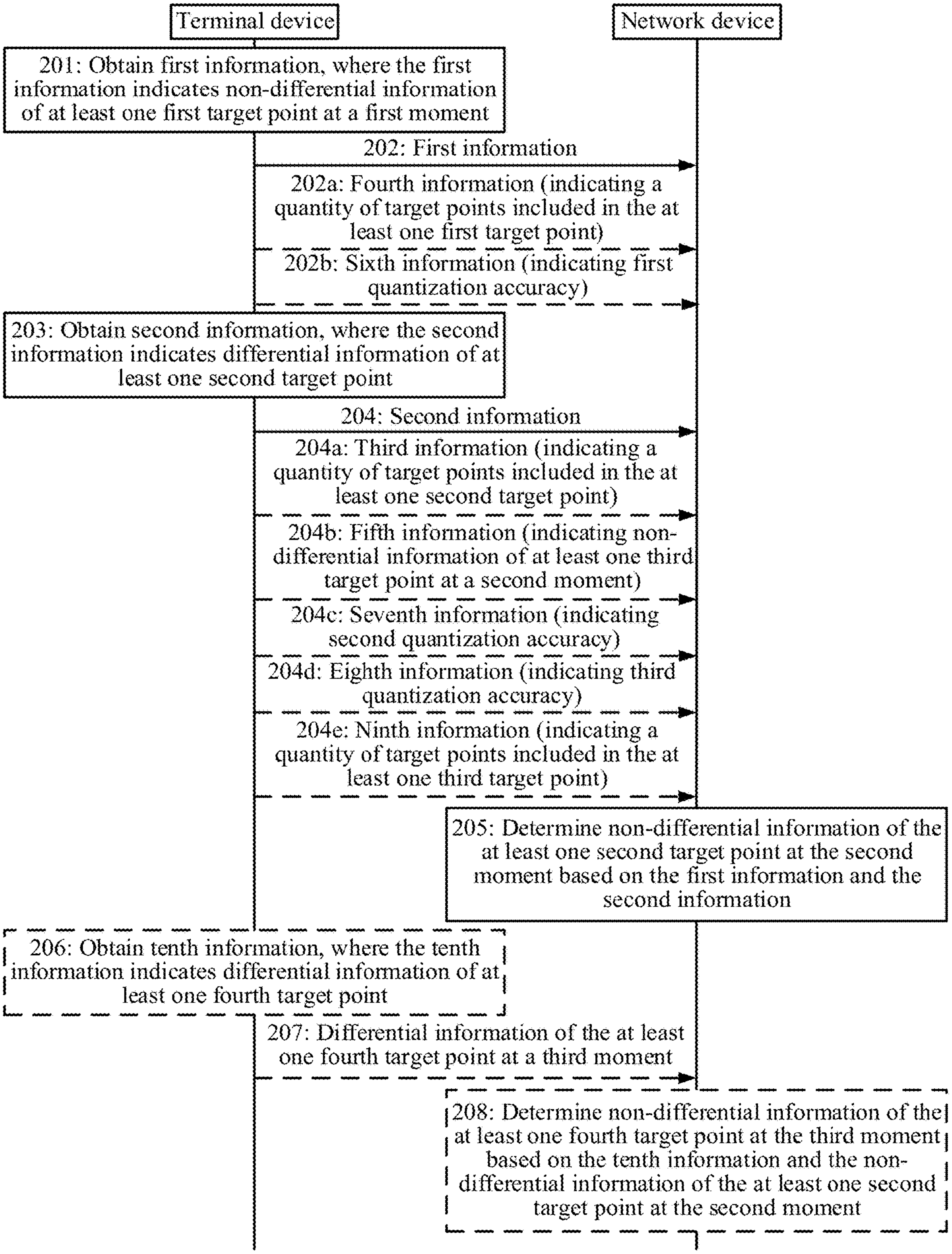
FIG. 2 is a schematic of an embodiment of a communication method according to an embodiment of this application.

FIG. 2 is a schematic of an embodiment of a communication method according to an embodiment of this application. Refer to FIG. 2. The communication method includes the following steps.

201: A terminal device obtains first information, where the first information indicates non-differential information of at least one first target point at a first moment.

The non-differential information includes position information, speed information, phase information, or amplitude information. This is not specifically limited in this application. For example, the position information includes a coordinate position and phase position information of the at least one first target point at the first moment. The speed information includes a moving speed of the at least one first target point at the first moment, and/or an acceleration of the at least one first target point at the first moment. The non-differential information may also be referred to as original information, complete information, or absolute information.

For example, as shown in FIG. 1, the terminal device senses at least one first target point at a moment 1, and the terminal device may determine position information of the at least one first target point at the moment 1. For example, the position information includes a coordinate position of each first target point at the moment 1. For example, the coordinate position is a two-dimensional coordinate position, including a horizontal coordinate position and a vertical coordinate position. Alternatively, the coordinate position is a three-dimensional coordinate position, including a coordinate position in an x direction, a coordinate position in a y direction, and a coordinate position in a z direction. The following describes the technical solution of this application by using a two-dimensional coordinate position as an example.

202: The terminal device sends the first information to a network device. Correspondingly, the network device receives the first information from the terminal device.

Optionally, the technical solution in this application is applicable to a communication transmission scenario, an image transmission scenario, and the like. This is not specifically limited in this application. For example, in the image transmission scenario, a basic frame (also referred to as an R frame) and a differential frame (also referred to as a P frame) may be transmitted between the terminal device and the network device. In the communication transmission scenario, an anchor frame and a differential frame may be transmitted between the terminal device and the network device. The following describes the technical solution of this application by using the image transmission scenario as an example.

Figure 3A:
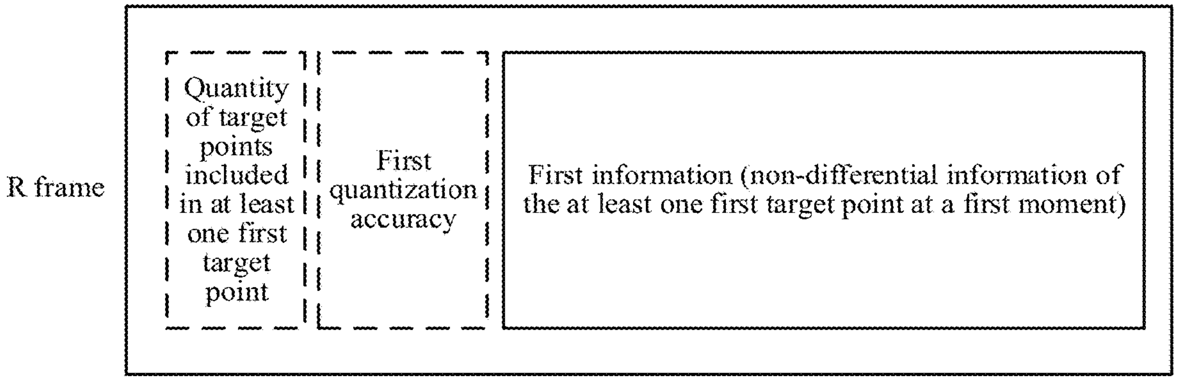
FIG. 3A is a schematic of a structure of an R frame according to an embodiment of this application.

For example, as shown in FIG. 3A, the terminal device sends an R frame to the network device, where the R frame includes the first information, and the first information indicates the non-differential information of the at least one first target point at the first moment.

Optionally, the embodiment shown in FIG. 2 further includes step 202*a*.

202*a*: The terminal device sends fourth information to the network device. The fourth information indicates a quantity of target points included in the at least one first target point. Correspondingly, the network device receives the fourth information from the terminal device.

It should be noted that the first information in step 202 and the fourth information in step 202*a* may be reported simultaneously, or may be reported separately. This is not specifically limited in this application.

For example, as shown in FIG. 3A, the terminal device sends an R frame to the network device, where the R frame includes the fourth information and the first information. The fourth information indicates the quantity of target points included in the at least one first target point. The first information indicates the non-differential information of the at least one first target point at the first moment. The network device may first read the fourth information in the R frame, and determine, based on the fourth information, the quantity of target points included in the at least one first target point. Then, the network device reads the first information based on the quantity of target points included in the at least one first target point, to determine position information of each of the at least one first target point.

It should be noted that the terminal device may indicate, in the manner in step 202*a*, the quantity of target points included in the at least one first target point. In actual application, a quantity of target points reported by the terminal device each time may be pre-agreed or preconfigured. In this case, the terminal device does not need to report the quantity of target points. This is not specifically limited in this application.

It should be noted that, optionally, the fourth information may include a quantity of bits of a fixed length; or a quantity of bits included in the fourth information is not fixed, and is specifically determined based on the quantity of the at least one first target point. A value of a bit in the fourth information represents the quantity of target points included in the at least one first target point.

Optionally, the embodiment shown in FIG. 2 further includes step 202*b*.

202*b*: The terminal device sends sixth information to the network device, where the sixth information indicates first quantization accuracy of the non-differential information of each of the at least one first target point at the first moment. Correspondingly, the network device receives the sixth information from the terminal device.

The first quantization accuracy represents a quantity of bits indicating the non-differential information of each first target point at the first moment.

For example, as shown in FIG. 3A, the terminal device sends an R frame to the network device, where the R frame includes the fourth information (indicating the quantity of target points included in the at least one first target point), the sixth information (indicating the first quantization accuracy), and the first information (indicating the non-differential information of the at least one first target point at the first moment).

It should be noted that the fourth information, the sixth information, and the first information are logically a whole, and in actual transmission, may be transmitted together or may be transmitted together with other data. Logically, the three pieces of information, namely, the fourth information, the sixth information, and the first information, jointly form an R frame format. The network device may first parse the fourth information and the sixth information, and after the parsing succeeds, parse the first information to obtain the non-differential information of each of the at least one first target point at the first moment.

For example, the first quantization accuracy is described by using the coordinate position of the first target point as an example. As shown in Table 1, some possible values of a horizontal coordinate or a vertical coordinate and corresponding bit values are shown.

TABLE 1

| Range of a horizontal coordinate or a vertical coordinate | Bit value |
|---|---|
| [−10, −5) | 00 |
| [−5, 0) | 01 |
| [0, 5) | 10 |
| [5, 10] | 11 |

The coordinate position of each first target point is a two-dimensional coordinate position, and specifically includes a horizontal coordinate and a vertical coordinate. It can be learned from Table 1 that a horizontal coordinate position of each first target point is represented by using two bits, and a vertical coordinate position of each first target point is represented by using two bits, that is, quantization accuracy of the coordinate position of each first target point is 4. For example, if a value of the horizontal coordinate of the first target point falls within a range of [−10, −5), and a value of the vertical coordinate falls within a range of [−5, 0], a value of a bit that is in the first information and that indicates the coordinate position of the first target point is 0001.

It should be noted that the interval division shown in Table 1 is merely an example. In actual interval division, a critical point of an interval may also be classified into a previous interval of the interval. For example, the interval [−10, −5) may be replaced with [−10, −5], the interval [−5, 0) may be replaced with (−5, 0], the interval [0, 5) may be replaced with (0, 5], and the interval [5, 10] may be replaced with (5, 10]. This is not specifically limited in this application.

It should be noted that step 202*b* is an implementation in which the terminal device reports the first quantization accuracy to the network device. In actual application, quantization accuracy of the position information of the first target point may be pre-agreed or preconfigured. Alternatively, the terminal device may report the first quantization accuracy once in step 202*b*, and does not need to report the first quantization accuracy in a subsequent period of time. In other words, quantization accuracy, reported by the terminal device in the subsequent period of time, of the position information of the target point is the first quantization accuracy. This is not specifically limited in this application.

203: The terminal device obtains second information. The second information indicates differential information of at least one second target point.

The differential information includes differential position information, differential speed information, differential phase information, or differential amplitude information. This is not specifically limited in this application. The differential information may also be referred to as relative information or incomplete information. This is not specifically limited in this application.

Each of the at least one second target point corresponds to one first target point, and differential information of each of the at least one second target point is determined based on non-differential information of the second target point at a second moment and non-differential information, at the first moment, of the first target point corresponding to the second target point. The at least one second target point is a target point sensed by the terminal device at the second moment.

Optionally, the first moment and the second moment are different moments, or the first moment and the second moment are a same moment. This is not specifically limited in this application. In a solution in which the first moment and the second moment are a same moment, it may be understood that the embodiment shown in FIG. 2 is for target points sensed by the terminal device at a same moment, non-differential information is reported for a part of target points, and differential information is reported for the other part of target points, where the differential information is determined based on non-differential information of the other part of target points at the first moment and non-differential information of the part of target points at the first moment.

Optionally, the first moment and the second moment are different moments. The first moment may be one moment before the second moment or P moments before the second moment, where P is an integer greater than 1. In other words, when the terminal device reports the differential information of the at least one second target point, non-differential information of a target point sensed by the terminal device at the first P moments may be used as reference non-differential information.

Optionally, the differential information of the at least one second target point includes differential position information of the at least one second target point. Differential position information of each of the at least one second target point is determined based on position information of the second target point at the second moment and position information, at the first moment, of the first target point corresponding to the second target point.

For example, for a second target point, a coordinate position of the second target point at a moment 2 is (x2, y2), and a coordinate position, at the moment 1, of a first target point corresponding to the second target point is (x1, y1). The terminal device quantizes, by using the first quantization accuracy, the coordinate position (x1, y1), at the moment 1, of the first target point corresponding to the second target point, to obtain (x1', y1'). Therefore, a differential coordinate position of the second target point is (x2−x1', y2−y1'). The terminal device quantizes the differential coordinate position (x2−x1', y2−y1') of the second target point by using second quantization accuracy, to obtain a quantized differential coordinate position of the second target point. A manner of calculating a differential coordinate position of a target point is similar below. Details are not described one by one in this application.

For example, as shown in FIG. 1, the terminal device senses at least one first target point at a moment 1, and the terminal device may determine position information of the at least one first target point at the moment 1. The terminal device quantizes the position information by using the first quantization accuracy, to obtain the first information. The terminal device senses at least one second target point at a moment 2, and the terminal device may determine position information of the at least one second target point at the moment 2. The terminal device determines a first target point corresponding to each second target point. Then, the terminal device determines the differential position information of each second target point based on the position information of each second target point at the moment 2 and the first information (that is, quantized position information, at the moment 1, of the first target point corresponding to the second target point). The terminal device quantizes the differential position information of each second target point by using the second quantization accuracy, to obtain the second information.

204: The terminal device sends the second information to the network device. Correspondingly, the network device receives the second information from the terminal device.

Figure 3B:
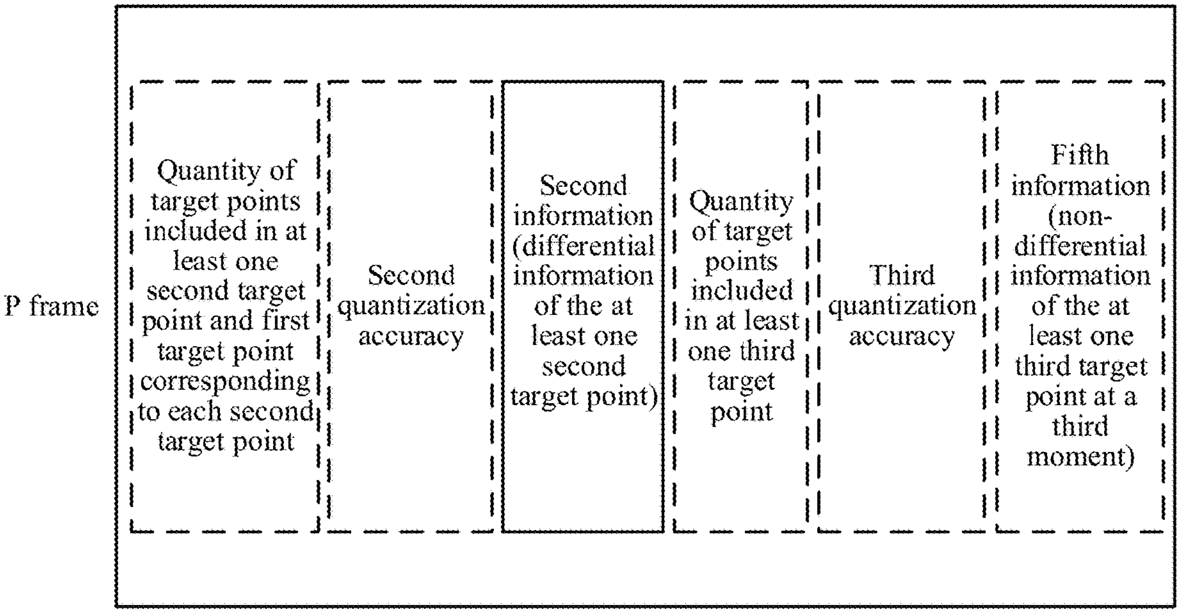
FIG. 3B is a schematic of a structure of a P frame according to an embodiment of this application.

For example, as shown in FIG. 3B, the terminal device sends a P frame to the network device, where the P frame includes the second information, and the second information indicates the differential information of the at least one second target point.

It can be learned that, in the technical solution of this application, differential information is determined by using a correlation between non-differential information of target points sensed by the terminal device, and the differential information is reported. Compressing the reported information helps reduce an amount of data reported and reduce signaling overheads.

For a solution in which the first moment and the second moment are different moments, a correlation may be a correlation between non-differential information of a target point sensed by the terminal device at different moments. For example, the non-differential information includes position information. For a same target point, position information at different moments changes slightly. Therefore, the terminal device may select, for the second target point sensed by the terminal device at the second moment, non-differential information of a first target point closest to the second target point as reference differential information. In addition, selecting the non-differential information of the first target point closest to the second target point as the reference differential information can make a differential value in the differential information of the second target point small, thereby further helping reduce indication overheads.

For a solution in which the first moment and the second moment are a same moment, a correlation may be a correlation between non-differential information of target points sensed by the terminal device at a same moment. For example, the non-differential information includes position information. When selecting a first target point corresponding to a second target point, the terminal device may select non-differential information of a first target point closest to the second target point as reference differential information. This helps reduce indication overheads.

Optionally, the embodiment shown in FIG. 2 further includes step 204*a*.

204*a*: The terminal device sends third information to the network device. The third information indicates a quantity of target points included in the at least one second target point and indicates the first target point corresponding to each of the at least one second target point. Correspondingly, the network device receives the third information from the terminal device.

Optionally, the third information is a bitmap, a quantity of bits included in the bitmap is equal to the quantity of the at least one first target point, and the bits in the bitmap are in one-to-one correspondence with the at least one first target point according to an indication sequence in which the first information indicates the non-differential information of the at least one first target point.

A bit whose value is 1 in the bitmap indicates that a first target point corresponding to the bit has a corresponding second target point, the second information indicates the differential information of the at least one second target point in a first sequence, and the first sequence is a sequence of second target points separately corresponding to first target points corresponding to bits whose values are 1 in the bitmap; or a bit whose value is 0 in the bitmap indicates that a first target point corresponding to the bit has a corresponding second target point, the second information indicates the differential information of the at least one second target point in a second sequence, and the second sequence is a sequence of second target points separately corresponding to first target points corresponding to bits whose values are 0 in the bitmap.

Figure 4:
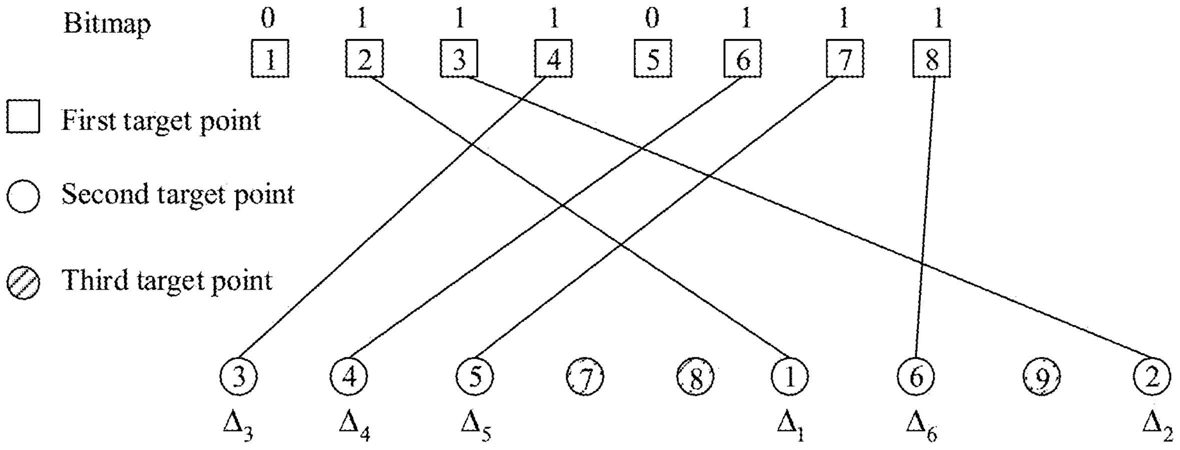
FIG. 4 is a schematic of an indication of a bitmap according to an embodiment of this application.

For example, as shown in FIG. 4, a bitmap is 01110111, and a quantity of bits in the bitmap is 8, indicating that the at least one first target point includes eight target points, which are respectively a first target point 1 to a first target point 8. The first information separately indicates non-differential information of the first target point 1, the first target point 2, the first target point 3, the second target point 4, the first target point 5, the first target point 6, the first target point 7, and the first target point 8 at the first moment. Therefore, in the bitmap, the $1^{st}$ bit "0" corresponds to the first target point 1, the $2^{nd}$ bit "1" corresponds to the first target point 2, the $3^{rd}$ bit corresponds to the first target point 3, the $4^{th}$ bit corresponds to the first target point 4, the $5^{th}$ bit corresponds to the first target point 5, the $6^{th}$ bit corresponds to the first target point 6, the $7^{th}$ bit corresponds to the first target point 7, and the $8^{th}$ bit corresponds to the first target point 8. Therefore, it can be learned that the first target point 1 has no corresponding second target point, and the first target point 2, the first target point 3, the second target point 4, the first target point 6, the first target point 7, and the first target point 8 all have corresponding second target points. For example, the first target point 2 corresponds to a second target point 1, the first target point 3 corresponds to a second target point 2, the first target point 4 corresponds to a second target point 3, the first target point 6 corresponds to a second target point 4, the first target point 7 corresponds to a second target point 5, and the first target point 8 corresponds to a second target point 6. For a specific correspondence between first target points and second target points, refer to the following related descriptions.

Therefore, the second information indicates the differential information of the at least one second target point in the sequence of second target points separately corresponding to first target points corresponding to bits whose values are 1 in the bitmap. Differential information of the second target point 1 at the second moment is $\Delta_1$, differential information of the second target point 2 at the second moment is $\Delta_2$, differential information of the second target point 3 at the second moment is $\Delta_3$, differential information of the second target point 4 at the second moment is $\Delta_4$, differential information of the second target point 5 at the second moment is $\Delta_5$, and differential information of the first target point 6 at the second moment is $\Delta_6$. Therefore, the second information is $\Delta_1\Delta_2$ $\Delta_3$ $\Delta_4$ $\Delta_5$ $\Delta_6$.

For example, as shown in FIG. 3B, the terminal device sends a P frame to the network device, where the P frame includes the third information and the second information, and the third information indicates the quantity of target points included in the at least one second target point and the first target point corresponding to each second target point. The second information indicates differential information of at least one second target point.

204*b*: The terminal device sends fifth information to the network device, where the fifth information indicates non-differential information of the at least one third target point at the second moment. Correspondingly, the network device receives the fifth information from the terminal device.

The at least one third target point does not correspond to the at least one first target point.

Optionally, the not corresponding includes that the at least one third target point does not match the at least one first target point, and/or an absolute value of a differential value in differential information corresponding to the at least one third target point is greater than a first threshold. For a matching process between target points, refer to the following related descriptions.

Optionally, the following factors may be considered for a value of the first threshold: the second quantization accuracy, third quantization accuracy, and a moving speed of the third target point. For the third quantization accuracy, refer to the following related descriptions. For example, if the first threshold is 2, that is, a differential value (for example, a horizontal coordinate differential value and a vertical coordinate differential value) corresponding to the at least one third target point exceeds a range of (−2, 2), the at least one third target point does not correspond to the at least one first target point.

Specifically, the second information in step 203 and the fifth information in step 204*b* may be reported together or separately. This is not specifically limited in this application.

For example, as shown in FIG. 3B, the terminal device sends a P frame to the network device, where the P frame includes the second information and the fifth information. The second information indicates the differential information of the at least one second target point, and the fifth information indicates the non-differential information of the at least one third target point at the second moment.

204*c*: The terminal device sends seventh information to the network device. The seventh information indicates second quantization accuracy of the differential information of each of the at least one second target point. Correspondingly, the network device receives the seventh information from the terminal device.

The second quantization accuracy represents a quantity of bits indicating the differential information of each second target point.

For example, as shown in FIG. 3B, the terminal device sends a P frame to the network device, where the P frame includes the fifth information, the seventh information, and the second information. The second information indicates the differential information of the at least one second target point, and the fifth information indicates the non-differential information of the at least one third target point at the second moment. The seventh information indicates the second quantization accuracy of the differential information of each of the at least one second target point.

It should be noted that the second information, the fifth information, and the seventh information are logically a whole, and in actual transmission, may be transmitted together or may be transmitted together with other data. Logically, the three pieces of information, namely, the fifth information, the seventh information, and the second information may belong to three parts of the P frame. The network device may first parse the fifth information and the seventh information, and after the parsing succeeds, parse the second information to obtain the differential information of each of the at least one second target point.

For example, the second quantization accuracy is described by using the differential position information of the second target point as an example. As shown in Table 2, an example in which the differential position information includes a horizontal coordinate differential value and a vertical coordinate differential value of the second target point is used to show some possible values of the horizontal coordinate differential value and the vertical coordinate differential value and corresponding bit values.

TABLE 2

| Range of a horizontal coordinate differential value and a vertical coordinate differential value | Bit value |
|---|---|
| [0, 0.5) | 0 |
| [0.5, 1] | 1 |

A differential coordinate position of each second target point includes a horizontal coordinate differential value and a vertical coordinate differential value. The horizontal coordinate differential value is represented by using one bit, and the vertical coordinate differential value is represented by using one bit. Therefore, the differential coordinate position of each second target point needs to be represented by using two bits, that is, the second quantization accuracy is 2. If a value of the horizontal coordinate differential value of the second target point falls within a range of [0, 0.5), and a value of the vertical coordinate differential value falls within a range of [0.5, 1], the bit value of a differential coordinate position of the second target point in the second information is 01.

It should be noted that the interval division shown in Table 2 is merely an example. In actual interval division, a critical point of an interval may also be classified into a previous interval of the interval. For example, the interval [0, 0.5) may be replaced with [0, 0.5], and the interval [0.5, 1] may be replaced with (0.5, 1]. This is not limited in this application.

It can be learned that, in the technical solution of this application, when the terminal device directly quantizes non-differential information sensed by the terminal device at the first moment, because a range of quantization that needs to be performed is large, the terminal device needs to perform quantization by using more bits to ensure accuracy of reported information. However, when the terminal device quantizes differential information of the terminal device at the second moment, because a range of differential quantization is small, the terminal device may perform quantization by using a small quantity of bits to achieve high accuracy.

For example, if a horizontal coordinate position or a vertical coordinate position of a target point sensed by the terminal device falls within a range of [−160, 160], if the terminal device uses six bits to represent the horizontal coordinate position, and uses six bits to represent the vertical coordinate position (that is, the terminal device uses 12 bits to quantize a coordinate position of the target point, in other words, quantization accuracy is 12 bits), it can be implemented that a quantization error does not exceed 2.5. When a horizontal coordinate differential value or a vertical coordinate differential value of a target point sensed by the terminal device falls within a range of [0, 1], if the terminal device uses two bits to represent a horizontal coordinate position, and uses two bits to represent a vertical coordinate position (that is, the terminal device uses four bits to quantize a differential coordinate position of the target point, in other words, quantization accuracy is four bits), it can be implemented that a differential quantization error does not exceed 0.25. It can be learned that, in the solution of reporting differential information by the terminal device, high differential quantization accuracy may be implemented by using fewer bits. In other words, if reporting overheads are the same, the solution in which the terminal device reports the differential information helps improve accuracy of reported information.

It should be noted that step 204*c* is an implementation in which the terminal device reports the second quantization accuracy to the network device. In an actual application, quantization accuracy of the differential information of the second target point may be pre-agreed or preconfigured. Alternatively, the terminal device may report the second quantization accuracy once in step 204*c*, and does not need to report the second quantization accuracy in a subsequent period of time. In other words, quantization accuracy, reported by the terminal device in the subsequent period of time, of the differential information of the target point is the second quantization accuracy. This is not specifically limited in this application.

It should be noted that step 204*c* is merely an example. Actually, for the at least one second target point, different quantization accuracy may be for differential information of different second target points. For example, the at least one second target point is divided into a first part of second target points and a second part of second target points. An absolute value of a differential value in differential information of each second target point in the first part of the second target points is less than or equal to a second threshold, and an absolute value of a differential value in differential information of each second target point in the second part of the second target points is greater than the second threshold and less than or equal to a third threshold. In the second information, the differential information of the first part of second target points is represented by using the second quantization accuracy, and the differential information of the second part of second target points is represented by using fourth quantization accuracy. For example, the differential information includes differential position information, and the differential position information includes a differential coordinate position of the second target point. An absolute value of a horizontal coordinate differential value and an absolute value of a vertical coordinate differential value of each second target point in the first part of second target points are both less than or equal to the second threshold. An absolute value of a horizontal coordinate differential value and an absolute value of a vertical coordinate differential value of each second target point in the second part of second target points are both greater than the second threshold and less than or equal to the third threshold.

Optionally, the following factors may be considered for setting the second threshold and the third threshold: the first quantization accuracy, the second quantization accuracy, the fourth quantization accuracy, and a moving speed of the second target point.

For example, the second threshold is 2, and the third threshold is 16. If a differential value (for example, a horizontal coordinate differential value and a vertical coordinate differential value) corresponding to the second target point falls within a range of (−2, 2), the differential information of the second target point may be indicated by using the second quantization accuracy. If the differential value (for example, the horizontal coordinate differential value and the vertical coordinate differential value) corresponding to the second target point falls outside the range of (−2, 2) and falls within a range of (−16, 16), the differential information of the second target point may be represented by using the fourth quantization accuracy.

Figure 3C:
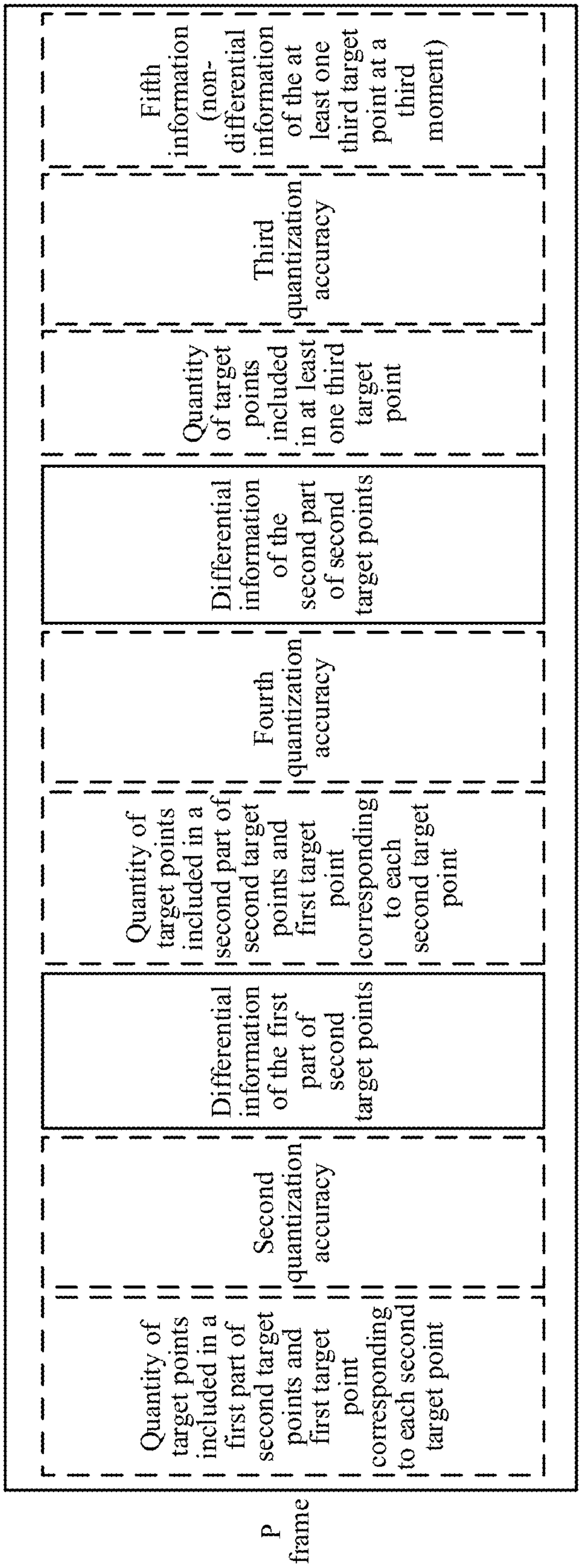
FIG. 3C is another schematic of a structure of a P frame according to an embodiment of this application.

For example, as shown in FIG. 3C, the terminal device sends a P frame to the network device, where differential information of a first part of second target points in the P frame is represented by using the second quantization accuracy, and differential information of a second part of second target points is represented by using the fourth quantization accuracy. It can be learned that, differential information of different second target points may be represented by using different quantization accuracy, thereby implementing more flexible compression. This helps ensure accuracy of the reported differential information.

204*d*: The terminal device sends eighth information to the network device. The eighth information indicates third quantization accuracy of the non-differential information of the at least one third target point at the second moment. Correspondingly, the network device receives the eighth information from the terminal device.

The third quantization accuracy represents a quantity of bits indicating non-differential information of each third target point at the second moment.

For example, as shown in FIG. 3B, the terminal device sends a P frame to the network device, where the P frame includes the third information (indicating the quantity of target points included in the at least one second target point and the first target point corresponding to each second target point), the seventh information (indicating the second quantization accuracy), the second information (indicating the differential information of the at least one second target point), the eighth information (indicating the third quantization accuracy), and the fifth information (indicating the non-differential information of the at least one third target point at the second moment).

It should be noted that step 204*d* is an implementation in which the terminal device reports the third quantization accuracy to the network device. In an actual application, quantization accuracy of differential information of the third target point may be pre-agreed or preconfigured. Alternatively, the terminal device may report the third quantization accuracy once in step 204*c*, and does not need to report the third quantization accuracy in a subsequent period of time. In other words, quantization accuracy, reported by the terminal device in the subsequent period of time, of the non-differential information of the target point is the third quantization accuracy. This is not specifically limited in this application.

Step 204*e*: The terminal device sends ninth information to the network device, where the ninth information indicates a quantity of target points included in the at least one third target point. Correspondingly, the network device receives the ninth information from the terminal device.

For example, as shown in FIG. 3B, the terminal device sends a P frame to the network device, where the P frame includes the third information (indicating the quantity of target points included in the at least one second target point and the first target point corresponding to each second target point), the seventh information (indicating the second quantization accuracy), the second information (indicating the differential information of the at least one second target point), the ninth information (indicating the quantity of target points included in the at least one third target point), the eighth information (indicating the third quantization accuracy), and the fifth information (indicating the non-differential information of the at least one third target point at the second moment).

205: The network device determines non-differential information of the at least one second target point at the second moment based on the first information and the second information.

The following describes a possible implementation of step 205 with reference to step 205*a* to step 205*c*.

205*a*: The network device determines the non-differential information of the at least one first target point at the first moment based on the first information.

For example, the network device determines, based on a default quantity of target points, the quantity of target points included in the at least one first target point. The network device reads the first information based on default quantization accuracy and the quantity of target points included in the at least one first target point. The network device reads the first information to determine the non-differential information of the at least one first target point at the first moment.

For example, the terminal device senses four first target points at the first moment. Non-differential information of each first target point at the first moment is represented by using four bits. To be specific, a horizontal coordinate position of the first target point at the first moment is represented by using the first two bits, and a vertical coordinate position is represented by using the last two bits. Therefore, the network device may read bits in the first information, where the first four bits represent non-differential information of the 1st first target point at the first moment, the 5th bit to the 8th bit represent non-differential information of the 2nd first target point at the first moment, the 9th bit to the 12th bit represent non-differential information of the 3rd first target point at the first moment, and the 13th bit to the 16th bit represent non-differential information of the 4th first target point.

For example, with reference to Table 1, in the bits in the first information, the first four bits are 0001. "00" represents that a horizontal coordinate position of the 1st first target point falls within [−10, −5). In this case, the network device may take −7.5. "01" represents that a vertical coordinate position of the 1st first target point falls within [−5, 0]. In this case, the network device may take −2.5. Therefore, a coordinate position of the 1st first target point at the first moment is (−7.5, −2.5). Similarly, the network device may determine that a coordinate position of the 2nd first target point at the first moment is (−2.5, 2.5), a coordinate position of the 3rd first target point at the first moment is (2.5, 7.5), and a coordinate position of the 4th first target point at the first moment is (−2.5, 5).

Based on step 202, step 202*a*, and step 202*b*, step 205*a* specifically includes:

The network device determines, based on the fourth information, the quantity of target points included in the at least one first target point. The network device reads the sixth information to determine the first quantization accuracy. The network device reads the first information based on the first quantization accuracy and the quantity of target points included in the at least one first target point, to obtain the non-differential information of the at least one first target point at the first moment.

For example, as shown in FIG. 3A, the network device parses the fourth information in the R frame to obtain the quantity of target points included in the at least one first target point. The network device parses the sixth information in the R frame to obtain the first quantization accuracy. The network device reads the first information based on the first quantization accuracy and the quantity of target points included in the at least one first target point. For example, the first quantization accuracy is four bits, and the at least one first target point includes four first target points. In this case, the network device determines that the first four bits in the first information represent non-differential information of the $1^{st}$ first target point at the first moment, the $5^{th}$ bit to the $8^{th}$ bit represent non-differential information of the $2^{nd}$ first target point at the first moment, the $9^{th}$ bit to the $12^{th}$ bit represent non-differential information of the $3^{rd}$ first target point at the first moment, and the $13^{th}$ bit to the $16^{th}$ bit represent non-differential information of the $4^{th}$ first target point.

205*b*: The network device determines the differential information of the at least one second target point based on the second information.

Specifically, the network device reads the second information based on the default quantity of target points and the default quantization accuracy, to obtain the differential information of the at least one second target point.

Based on the second information in step 203, the third information in step 204*a*, and the fifth information in step 204*b*, optionally, step 205*b* specifically includes:

The network device determines, based on the third information, the quantity of target points included in the at least one second target point. The network device determines the second quantization accuracy based on the fifth information. The network device determines the differential information of the at least one second target point based on the second quantization accuracy and the quantity of target points included in the at least one second target point.

For example, the third information is a bitmap, and the bitmap is 0111. It can be learned that the network device determines, based on a quantity of bits whose values are 1 in the bitmap, that the at least one second target point includes three second target points. The second quantization accuracy is two bits. Therefore, it can be learned that the differential information of each second target point at the second moment is represented by using two bits. Therefore, the network device may read bits in the second information, where the first two bits represent differential information of the $1^{st}$ second target point, the $3^{rd}$ bit and the $4^{th}$ bit represent differential information of the $2^{nd}$ second target point, and the $5^{th}$ bit and the $6^{th}$ bit represent differential information of the $3^{rd}$ second target point.

For example, with reference to Table 2, it can be learned that, in the bits in the second information, the first two bits are 01. 0 represents that a horizontal coordinate differential value of the $1^{st}$ second target point falls within a range between [0, 0.5). Therefore, the network device may determine that the horizontal coordinate differential value of the $1^{st}$ second target point is 0.25. 1 represents that a vertical coordinate differential value of the $1^{st}$ second target point falls within a range between [0.5, 1]. Therefore, the network device may determine that the vertical coordinate differential value of the $1^{st}$ second target point is 0.75. Therefore, a differential coordinate position of the $1^{st}$ second target point is (0.25, 0.75). Similarly, the network device determines that a differential coordinate position of the $2^{nd}$ second target point is (0.25, 0.25), and a differential coordinate position of the $3^{rd}$ second target point is (0.75, 0.25).

205*c*: The network device determines the non-differential information of the at least one second target point at the second moment based on the non-differential information of the at least one first target point and the differential information of the at least one second target point.

Specifically, the network device determines, based on the third information, the first target point corresponding to each second target point. Then, the network device determines the non-differential information of the at least one second target point at the second moment based on the non-differential information of the at least one first target point, the differential information of the at least one second target point, and the first target point corresponding to each second target point.

For example, the third information is a bitmap, and the bitmap is 0111. It can be learned from the bitmap that, the non-differential information, indicated in the first information, of the $2^{nd}$ first target point at the first moment corresponds to the differential information, indicated in the second information, of the $1^{st}$ second target point. That is, the differential information, indicated in the second information, of the $1^{st}$ second target point is determined by using the non-differential information, indicated in the first information, of the $2^{nd}$ first target point at the first moment as the reference non-differential information.

For example, a coordinate position of the $2^{nd}$ first target point at the first moment is (−2.5, 2.5), and a differential coordinate position of the $1^{st}$ second target point is (0.25, 0.75). Therefore, the network device may determine that a coordinate position of the $1^{st}$ second target point is (−2.25, 3.25). The non-differential information, indicated in the first information, of the $3^{rd}$ first target point at the first moment corresponds to the differential information, indicated in the second information, of the $2^{nd}$ second target point. That is, the differential information, indicated in the second information, of the $2^{nd}$ second target point is determined by using the non-differential information, indicated in the first information, of the $3^{rd}$ first target point at the first moment as the reference non-differential information. For example, a coordinate position of the $3^{rd}$ first target point at the first moment is (2.5, 7.5), and a differential coordinate position of the $2^{nd}$ second target point is (0.25, 0.25). Therefore, the network device may determine that a coordinate position of the $2^{nd}$ second target point is (−2.25, −7.25). Similarly, a coordinate position of the $3^{rd}$ second target point is (−1.75, −4.75).

It can be learned that, in the technical solution provided in this application, the terminal device reports the differential information of the at least one second target point to the network device, thereby reducing signaling overheads. In other words, the terminal device reports the differential information of the at least one second target point to the network device, which helps improve accuracy of the differential information reported by the terminal device when signaling overheads are fixed, thereby indirectly improving accuracy of obtaining the non-differential information of the at least one second target point by the network device.

Optionally, the embodiment shown in FIG. 2 further includes step 206 to step 208. Step 206 to step 208 may be performed after step 205.

206: The terminal device obtains tenth information, where the tenth information indicates differential information of at least one fourth target point.

The differential information of the at least one fourth target point is determined based on the non-differential information of the at least one second target point at the second moment and non-differential information of the at least one fourth target point at a third moment. Each of the at least one fourth target point corresponds to one second target point.

The non-differential information of the at least one second target point at the second moment is determined by the network device by using differential information (that is, the differential information of the at least one second target point at the second moment) that is successfully received last time. The third moment is a moment after the second moment.

For example, the third moment is the $1^{st}$ moment after the second moment, or the third moment is a $P^{th}$ moment after the second moment. However, from the $1^{st}$ moment to a $(P-1)^{th}$ moment after the second moment, the network device fails in receiving differential information that is of a target point sensed from the $1^{st}$ moment to the (P−1)th moment and that is reported by the terminal device.

207: The terminal device sends the differential information of the at least one fourth target point at the third moment to the network device. Correspondingly, the network device receives, from the terminal device, the differential information of the at least one fourth target point at the third moment.

For example, the terminal device sends a P frame to the network device, where the P frame includes the tenth information, where the tenth information indicates the differential information of the at least one fourth target point.

It can be learned that, in the technical solution of this application, differential information is determined by using a correlation between non-differential information of target points sensed by the terminal device, and the differential information is reported. Compressing the reported information helps reduce an amount of data reported and reduce signaling overheads.

208: The network device determines the non-differential information of the at least one fourth target point at the third moment based on the tenth information and the non-differential information of the at least one second target point at the second moment.

Specifically, the network device determines the differential information of the at least one fourth target point at the third moment based on the tenth information. Then, the network device determines the non-differential information of the at least one fourth target point at the third moment based on the differential information of the at least one fourth target point at the third moment and the non-differential information of the at least one second target point at the second moment.

Step 208 is similar to step 205. For details, refer to related descriptions of step 205. Details are not described herein again.

In this embodiment of this application, the terminal device obtains the first information, where the first information indicates the non-differential information of the at least one first target point at the first moment, and the at least one first target point is the target point sensed by the terminal device at the first moment. The terminal device sends the first information to the network device. Then, the terminal device obtains the second information, where the second information indicates the differential information of the at least one second target point, each of the at least one second target point corresponds to one first target point, the differential information of each of the at least one second target point is determined based on the non-differential information of the second target point at the second moment and the non-differential information, at the first moment, of the first target point corresponding to the second target point, and the at least one second target point is the target point sensed by the terminal device at the second moment; and the terminal device sends the second information to the network device. It can be learned from the foregoing technical solution that, the terminal device reports the differential information of the at least one second target point sensed at the second moment, and the differential information of each of the at least one second target point is determined based on the non-differential information of the second target point at the second moment and the non-differential information, at the first moment, of the first target point corresponding to the second target point. Compared with a solution in which the terminal device reports non-differential information of a target point sensed at each moment to the network device, the solution in which the terminal device reports the differential information of the at least one second target point reduces an amount of data reported, and reduces signaling overheads.

The following describes, with reference to step a and step b, a process in which the terminal device determines the at least one second target point and the at least one third target point.

Step a: The terminal device determines, according to a pairing algorithm, a target point that is paired with the first target point and a target point that is not paired with the first target point in the target point sensed by the terminal device at the second moment.

The following describes a possible implementation of step a with reference to step 1 to step 3.

Step 1: The terminal device determines a first weighted bipartite graph based on the at least one first target point and the target point sensed by the terminal device at the second moment.

The first weighted bipartite graph includes a first-type vertex and a second-type vertex, where the first-type vertex represents the first target point, and the second-type vertex represents the target point sensed by the terminal device at the second moment. Optionally, an example in which the non-differential information includes the position information is used herein for description. A weight of each edge in the first weighted bipartite graph is a distance between a first target point connected to the edge and a target point that is sensed by the terminal device at the second moment and that is connected to the edge.

Figure 5A:
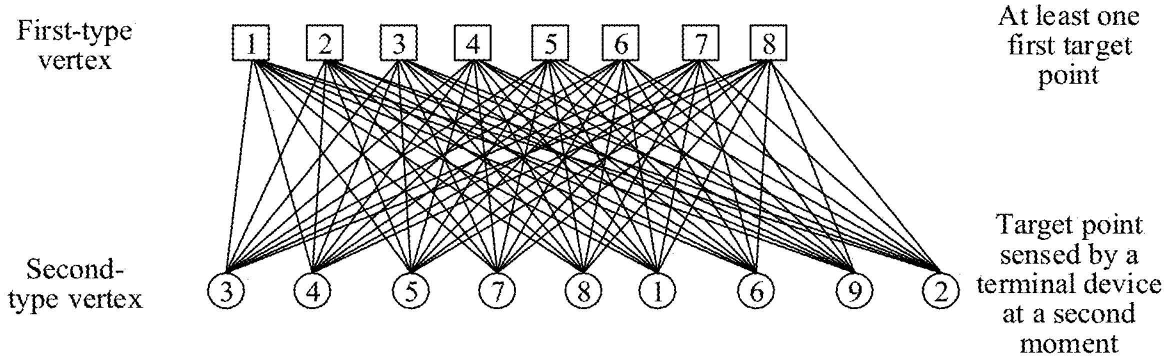
FIG. 5A is a schematic of a first weighted bipartite graph according to an embodiment of this application.

For example, as shown in FIG. 1, the terminal device senses eight target points at the moment 1, and senses nine target points at the moment 2. The first weighted bipartite graph is shown in FIG. 5A, where each first-type vertex is connected to each second-type vertex in the first weighted bipartite graph. For example, a coordinate position of a first target point 1 at the moment 1 is (x1, y1), and a coordinate position of a target point 3 sensed by the terminal device at the second moment at the moment 2 is (x2, y2). Therefore, a weight of an edge between the first target point 1 and the target point 3 sensed by the terminal device at the second moment may be represented as $\sqrt{(x2-x1)^2+(y2-y1)^2}$.

Step 2: The terminal device determines a second weighted bipartite graph based on a minimum weight matching algorithm and the first weighted bipartite graph.

The second weighted bipartite graph includes a first-type vertex and a second-type vertex, where one first-type vertex in the second weighted bipartite graph corresponds to one second-type vertex in the second weighted bipartite graph.

The second weighted bipartite graph includes N edges, and first-type vertices and second-type vertices connected to different edges in the N edges are different, where N is a minimum value of the quantity of the at least one first target point and a quantity of target points sensed by the terminal device at the second moment. The N edges are N edges with a minimum weight sum in edges that are connected to different first-type vertices and different second-type vertices in the first weighted bipartite graph, where N is an integer greater than or equal to 1.

Figure 5B:
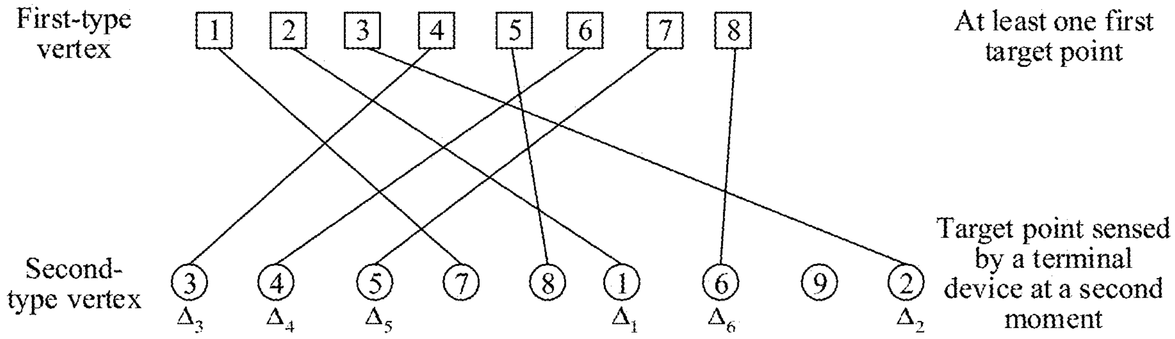
FIG. 5B is a schematic of a second weighted bipartite graph according to an embodiment of this application.

For example, as shown in FIG. 5B, because the at least one first target point includes eight first target points, the terminal device senses nine target points at the second moment. Therefore, the second weighted bipartite graph includes eight edges, and each edge is connected to one first-type vertex and one second-type vertex. The eight edges are eight edges, shown in FIG. 5A, with the minimum weight sum in the edges that are connected to different first-type vertices and different second-type vertices in the first weighted bipartite graph.

The following describes, with reference to step 21 to step 23, a specific process in which the terminal device determines the second weighted bipartite graph.

Step 21: The terminal device constructs a third weighted bipartite graph based on the first weighted bipartite graph.

A quantity of first-type vertices in the third weighted bipartite graph is the same as a quantity of second-type vertices, and each first-type vertex in the third weighted bipartite graph is connected to each second-type vertex in the third weighted bipartite graph.

Specifically, if a quantity of first-type vertices in the first weighted bipartite graph is different from a quantity of second-type vertices, the terminal device adds a dumb node and a dumb edge with a large weight to the first weighted bipartite graph, to obtain the third weighted bipartite graph. The weight of the dumb edge is greater than a product of a weight of an edge with a maximum weight in the first weighted bipartite graph and a quantity of vertices included in the first weighted bipartite graph.

Figure 6A:
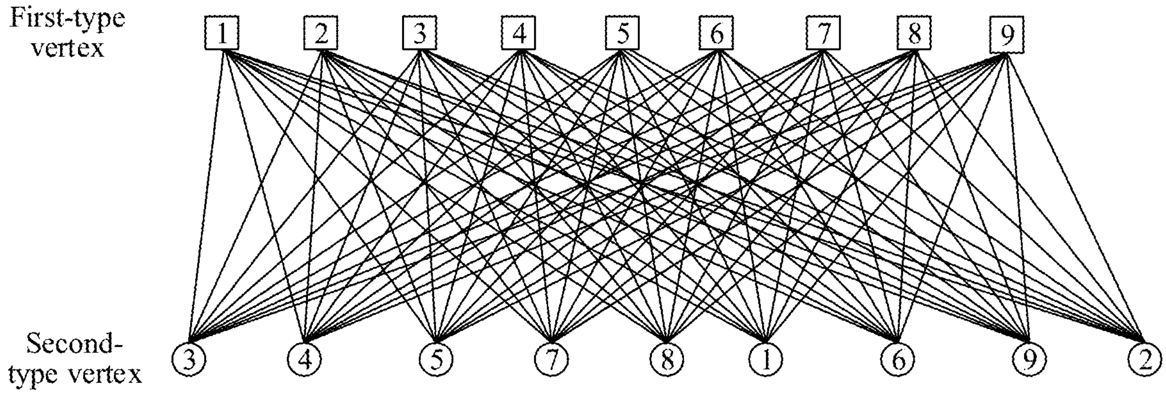
FIG. 6A is a schematic of a third weighted bipartite graph according to an embodiment of this application.

For example, as shown in FIG. 5A, there are eight first-type vertices and nine second-type vertices in the first weighted bipartite graph. The terminal device adds one first-type vertex (for example, a first-type vertex 9 in FIG. 6A) to the first weighted bipartite graph. The terminal device connects the first-type vertex to each second-type vertex in the first weighted bipartite graph, to obtain a third weighted bipartite graph shown in FIG. 6A. A weight of an edge between the first-type vertex and each second-type vertex in the first weighted bipartite graph is greater than the product of the weight of the edge with the maximum weight in the first weighted bipartite graph and the quantity of vertices included in the first weighted bipartite graph.

Step 22: The terminal device selects M edges from the third weighted bipartite graph.

M is the quantity of first-type vertices or second-type vertices in the third weighted bipartite graph. Different edges in the M edges connected to different first-type vertices and different second-type vertices, and the M edges are M edges with a minimum weight sum in edges that are connected to different first-type vertices and different second-type vertices in the third weighted bipartite graph.

For example, a set E includes all edges included in the third weighted bipartite graph. The terminal device determines a set F based on the set E, where the set F makes minimum $\Sigma_{e \in F}\omega(e)$.

The set F includes M edges, and each of the M edges is connected to a different first-type vertex and a different second-type vertex.

The terminal device may parse a formula 1 by using an algorithm such as a primal-dual algorithm to obtain the M edges.

Step 23: The terminal device deletes, from the M edges, an edge connected to a dumb node, to obtain N edges.

Figure 6B:
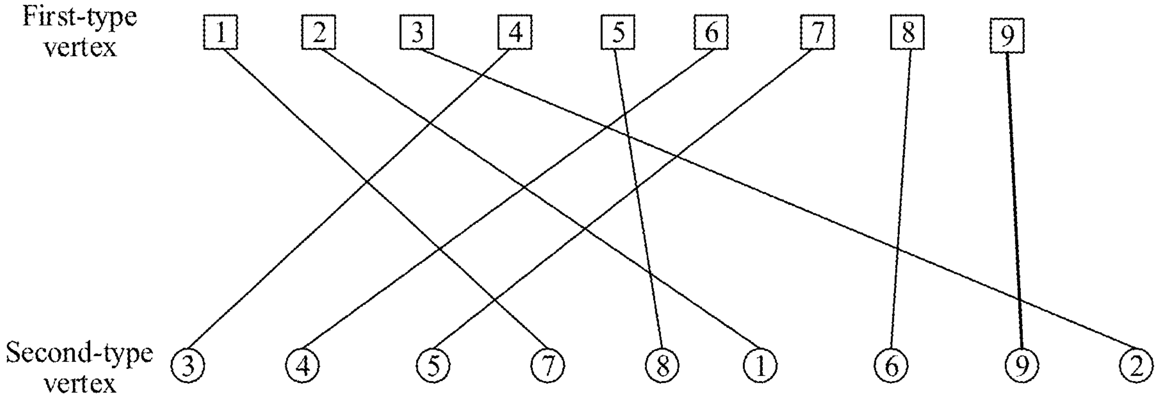
FIG. 6B is a schematic of M edges selected by a terminal device from a third weighted bipartite graph according to an embodiment of this application.

For example, as shown in FIG. 6B, the terminal device deletes an edge connected to a second-type vertex 9 and a first-type vertex 9, to obtain the third weighted bipartite graph shown in FIG. 5B.

Step 3: The terminal device uses, as the target point paired with the first target point, a target point that is sensed by the terminal device at the second moment and that is connected to an edge included in the second weighted bipartite graph, and uses, as the target point not paired with the first target point, a target point that is sensed by the terminal device at the second moment and that is unpaired in the second weighted bipartite graph.

For example, as shown in FIG. 5B, the terminal device uses a target point 1 to a target point 8 sensed at the second moment as target points paired with the first target point, and uses a target point 9 sensed at the second moment as a target point that is not paired with the first target.

The following describes another possible implementation of step a with reference to step 4 and step 5.

Step 4: The terminal device determines a first weighted bipartite graph based on the at least one first target point and the target point sensed by the terminal device at the second moment.

Step 4 is similar to step 1. For details, refer to related descriptions of step 1. Details are not described herein again.

Step 5: The terminal device selects N edges from the first weighted bipartite graph by using a greedy algorithm.

First-type vertices and second-type vertices connected to different edges in the N edges are different, where N is a minimum value of the quantity of the at least one first target point and a quantity of target points sensed by the terminal device at the second moment.

Specifically, the terminal device selects an edge with a maximum weight from the first weighted bipartite graph, and then the terminal device erases the edge and another edge connected to a first-type vertex and a second-type vertex that are connected to the edge, to obtain an updated first weighted bipartite graph. Then, the terminal device selects an edge with a maximum weight from the updated first weighted bipartite graph, and then the terminal device erases the edge and another edge connected to a first-type vertex and a second-type vertex that are connected to the edge, to obtain another updated first weighted bipartite graph. By analogy, the terminal device obtains the N edges.

Step 6: The terminal device uses, as the target point paired with the first target point, a target point that is sensed by the terminal device at the second moment and that is connected to each of the N edges, and uses, as the target point that is not paired with the first target point, a target point other than the target point that is sensed by the terminal device at the second moment and that is connected to the N edges in the target point sensed by the terminal device at the second moment.

Step b: The terminal device uses, as the at least one second target point, a target point that is in the target point paired with the first target point and that corresponds to differential information in which an absolute value of a differential value is less than the first threshold, and uses, as the at least one third target point, the target point that is not paired with the first target point and a target point that is in the target point paired with the first target point and that corresponds to differential information in which a differential value is greater than the first threshold.

For the first threshold, refer to the foregoing related descriptions. Details are not described herein again.

Optionally, the differential information includes differential position information, and the differential position information includes a horizontal coordinate differential value and a vertical coordinate differential value. The terminal device uses, as the at least one second target point, a target point that is in the target points paired with the first target point and that corresponds to an absolute value of a horizontal coordinate differential value and an absolute value of a vertical coordinate differential value that are both less than the first threshold. The terminal device uses, as the at least one third target point, the target point that is not paired with the first target point and a target point that is in the target point paired with the first target point and that corresponds to a horizontal coordinate differential value or a vertical coordinate differential value whose absolute value is greater than the first threshold.

Figure 6C:
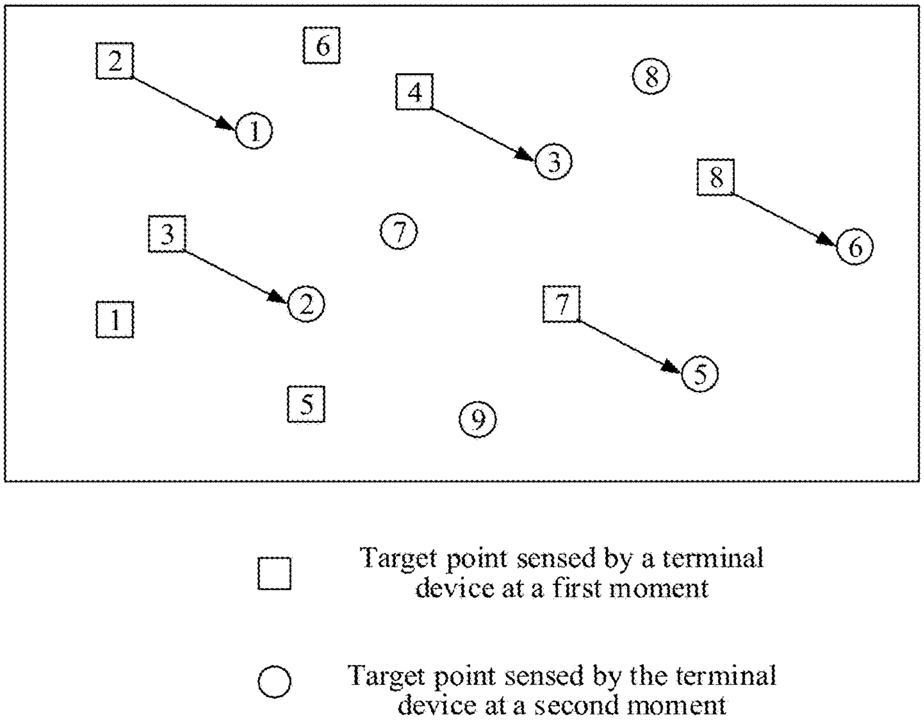
FIG. 6C is a schematic of pairing in a communication method according to an embodiment of this application.

For example, FIG. 6C is a schematic of a pairing effect in a communication method according to an embodiment of this application. As shown in FIG. 6C, the target point paired with the first target point includes a target point 1 to a target point 8 that are sensed by the terminal device at the second moment. The target point that is not paired with the first target point includes a target point 9 sensed by the terminal device at the second moment. Both absolute values of horizontal coordinate differential values and absolute values of vertical coordinate differential values in differential coordinate positions corresponding to the target point 1 to the target point 6 are less than the first threshold. Therefore, the terminal device uses the target point 1 to the target point 6 as the at least one second target point. Absolute values of horizontal coordinate differential values and/or absolute values of vertical coordinate differential values in differential coordinate positions corresponding to the target point 7 and the target point 8 are greater than the first threshold. Therefore, the terminal device uses the target point 7 to the target point 9 as the at least one third target point.

It can be learned from the foregoing pairing process that, differential information is determined by using a correlation between non-differential information of target points sensed by the terminal device, and the differential information is reported. For a solution in which the first moment and the second moment are different moments, a correlation may be a correlation between non-differential information of a target point sensed by the terminal device at different moments. For example, the non-differential information includes position information. For a same target point, position information at different moments changes slightly. Therefore, the terminal device may select, for the second target point sensed by the terminal device at the second moment, non-differential information of a first target point closest to the second target point as reference differential information. In addition, selecting the non-differential information of the first target point closest to the second target point as the reference differential information can make a differential value in the differential information of the second target point small, thereby further helping reduce indication overheads. For a solution in which the first moment and the second moment are a same moment, a correlation may be a correlation between non-differential information of target points sensed by the terminal device at a same moment. For example, the non-differential information includes position information. When selecting a first target point corresponding to a second target point, the terminal device may select non-differential information of a first target point closest to the second target point as reference differential information. In this way, a compression effect of differential coding is maximized. Therefore, an amount of data reported is reduced, and signaling overheads are reduced.

The foregoing describes a process in which the terminal device determines the at least one second target point and the at least one third target point. A process in which the terminal device determines the at least one fourth target point and a second target point corresponding to each fourth target point is similar. Details are not described herein again.

In this application, optionally, if the first moment and the second moment are a same moment, the terminal device may send the first information and the second information to the network device by using a P frame. Optionally, the P frame further includes the third information, the fourth information, the sixth information, and the seventh information.

Figure 7A:
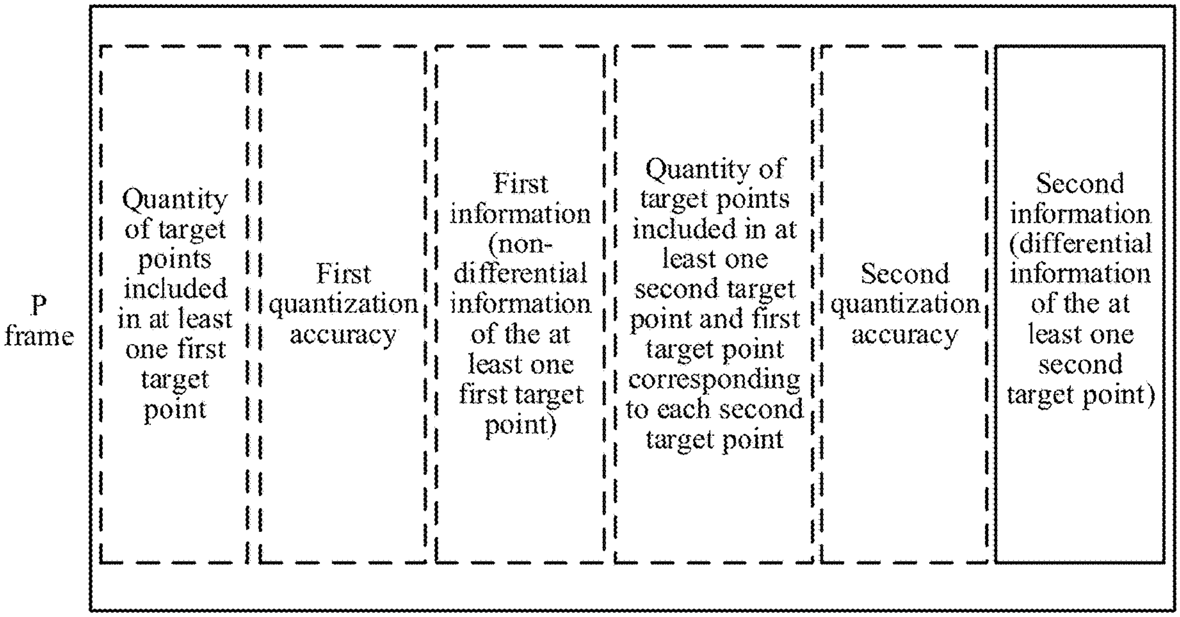
FIG. 7A is another schematic of a structure of a P frame according to an embodiment of this application.

For example, as shown in FIG. 7A, the P frame includes the first information (indicating the non-differential information of the at least one first target point) and the second information (indicating the differential information of the at least one second target point). Optionally, the P frame further includes the third information (indicating the quantity of target points included in the at least one second target point and the first target point corresponding to each second target point), the fourth information (indicating the quantity of target points included in the at least one first target point), the sixth information (indicating the first quantization accuracy), and the seventh information (indicating the second quantization accuracy).

Optionally, the embodiment shown in FIG. 2 further includes step 204*f*.

Step 204*f*: The terminal device sends twelfth information to the network device, where the twelfth information indicates differential information of at least one seventh target point sensed by the terminal device at the first moment. The differential information of the at least one seventh target point sensed by the terminal device at the first moment is determined based on non-differential information of the at least one second target point at the first moment and non-differential information of the at least one seventh target point at the first moment.

For example, the at least one second target point includes three second target points: a second target point 1, a second target point 2, and a second target point 3. The at least one seventh target point includes two seventh target points: a seventh target point 1 and a seventh target point 2. The seventh target point 1 corresponds to the second target point 1, that is, differential information of the seventh target point 1 is determined based on non-differential information of the seventh target point 1 at the first moment and non-differential information of the second target point 1 at the first moment. The seventh target point 2 corresponds to the second target point 2, that is, differential information of the seventh target point 2 is determined based on non-differential information of the seventh target point 2 at the first moment and non-differential information of the second target point 2 at the first moment.

Optionally, the embodiment shown in FIG. 2 further includes step 204*g*.

204*g*: The terminal device sends thirteenth information to the network device, where the thirteenth information indicates a quantity of target points included in the at least one seventh target point and a second target point corresponding to each seventh target point.

Optionally, the thirteenth information is a bitmap, and a quantity of bits in the bitmap is a quantity of the at least one second target point. The bits in the bitmap are in one-to-one correspondence with the at least one second target point according to an indication sequence in which the second information indicates differential information of the at least one second target point.

A bit whose value is 1 in the bitmap indicates that a second target point corresponding to the bit has a corresponding seventh target point, the twelfth information indicates the differential information of the at least one seventh target point in a third sequence, and the third sequence is a sequence of seventh target points separately corresponding to second target points corresponding to bits whose values are 1 in the bitmap; or a bit whose value is 0 in the bitmap indicates that a second target point corresponding to the bit has a corresponding seventh target point, the twelfth information indicates the differential information of the at least one seventh target point in a fourth sequence, and the fourth sequence is a sequence of seventh target points separately corresponding to second target points corresponding to bits whose values are 0 in the bitmap.

For example, the bitmap is 110. It can be learned that the at least one second target point includes three second target points: a second target point 1, a second target point 2, and a second target point 3. There are two bits whose values are 1 in the bitmap. Therefore, the at least one seventh target point includes two seventh target points: a seventh target point 1 and a seventh target point 2. The seventh target point 1 corresponds to the second target point 1, and the seventh target point 2 corresponds to the second target point 2.

Optionally, the embodiment shown in FIG. 2 further includes step 204*h*.

204*h*: The terminal device sends fourteenth information to the network device, where the fourteenth information indicates seventh quantization accuracy that is in the twelfth information and that indicates the differential information of the at least one seventh target point.

Figure 7B:
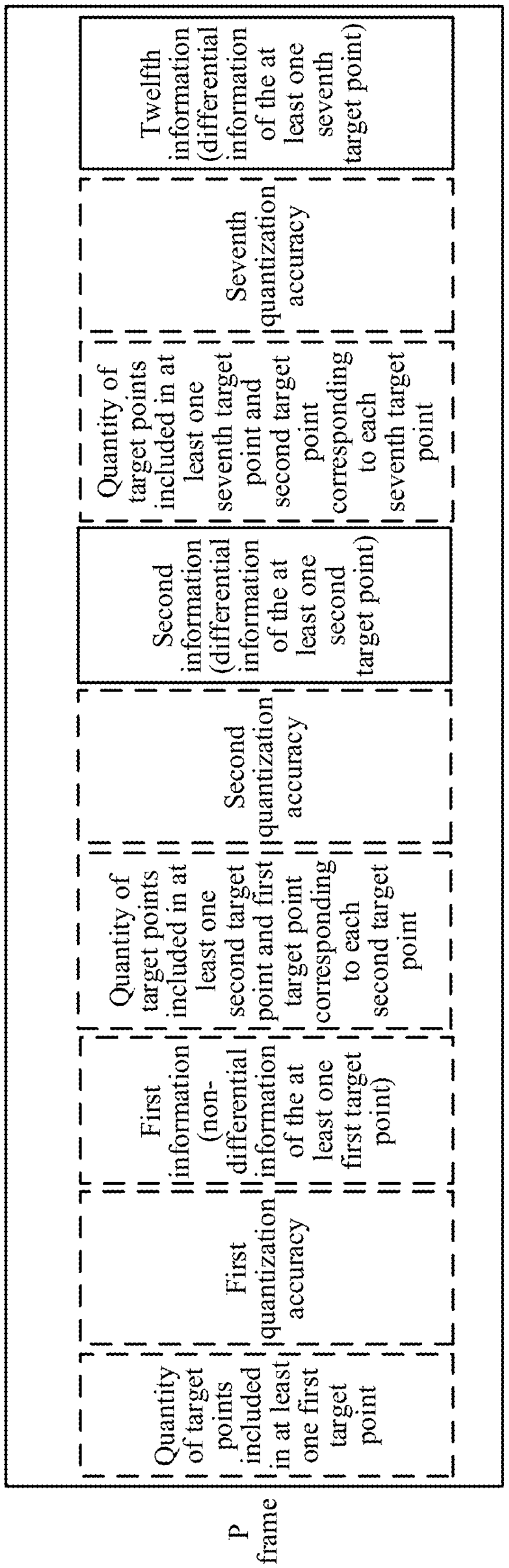
FIG. 7B is another schematic of a structure of a P frame according to an embodiment of this application.

For example, as shown in FIG. 7B, the terminal device sends a P frame to the network device, where the P frame includes the first information (indicating the non-differential information of the at least one first target point), the second information (indicating the differential information of the at least one second target point), and the twelfth information (indicating the differential information of the at least one seventh target point). Optionally, the P frame further includes the third information (indicating the quantity of target points included in the at least one second target point and the first target point corresponding to each second target point), the fourth information (indicating the quantity of target points included in the at least one first target point), the sixth information (indicating the first quantization accuracy), the seventh information (indicating the second quantization accuracy), and the thirteenth information (indicating the seventh quantization accuracy).

Figure 8:
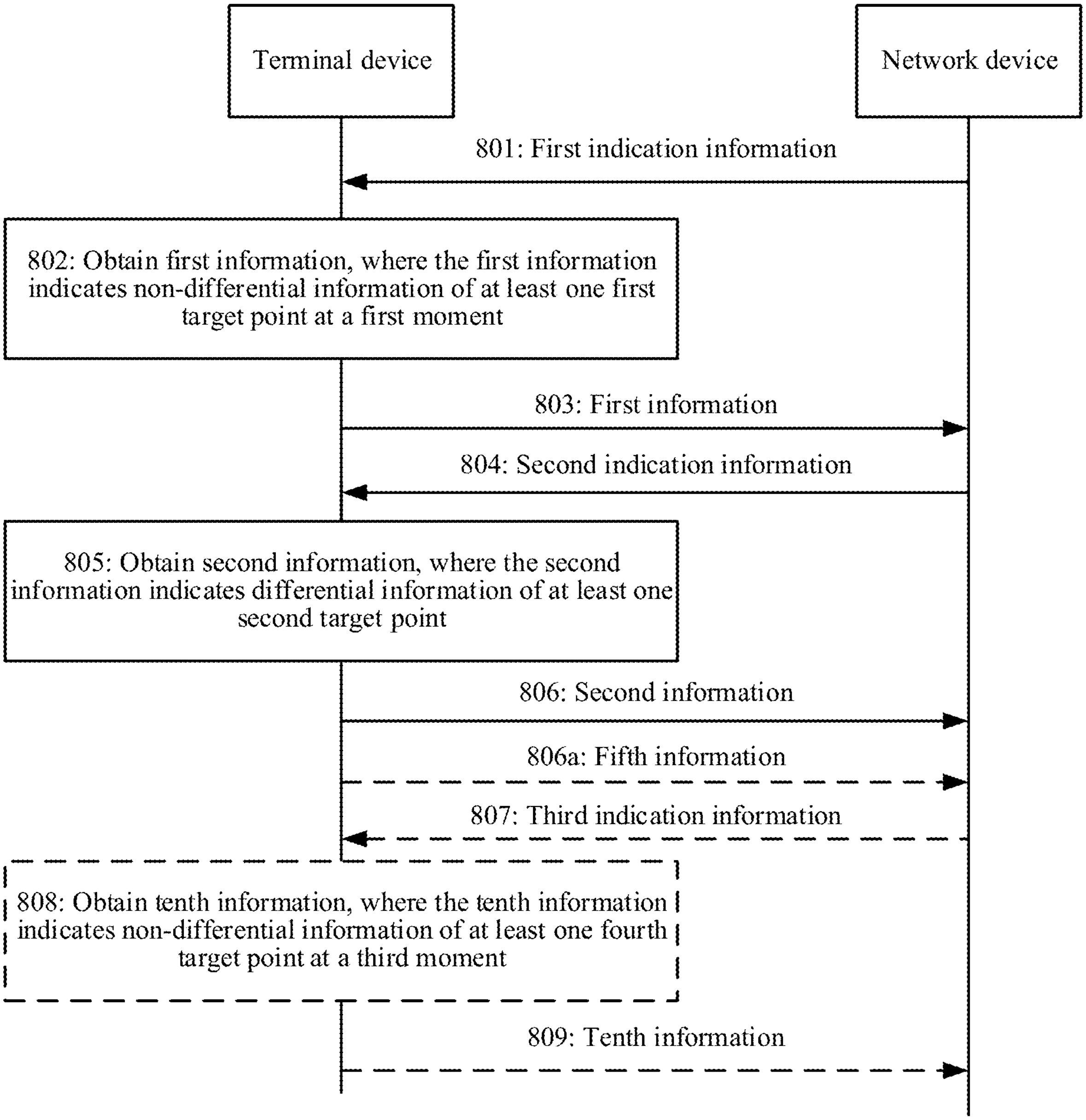
FIG. 8 is a schematic of another embodiment of a communication method according to an embodiment of this application.
Figure 9:
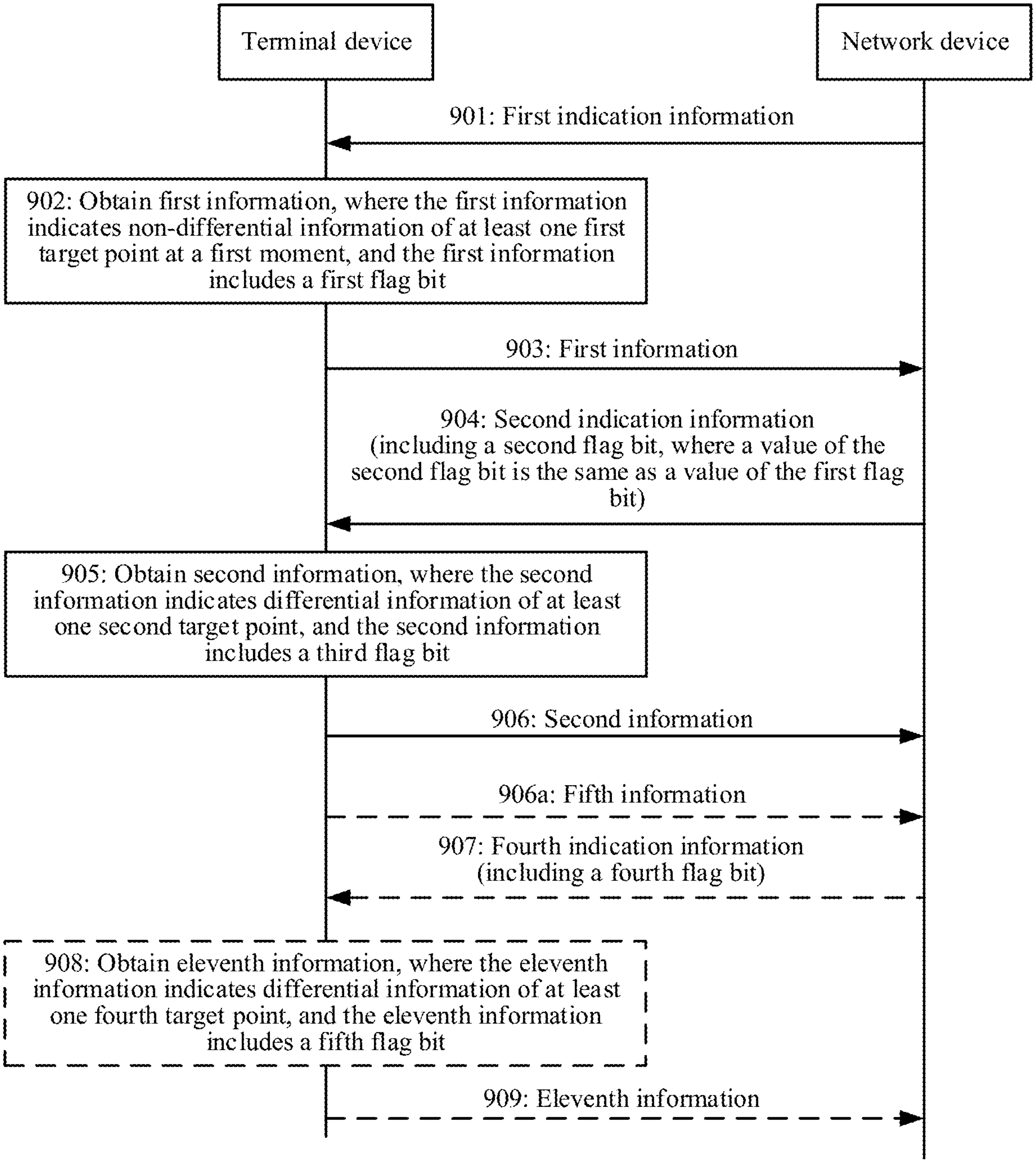
FIG. 9 is a schematic of another embodiment of a communication method according to an embodiment of this application.
Figure 10:
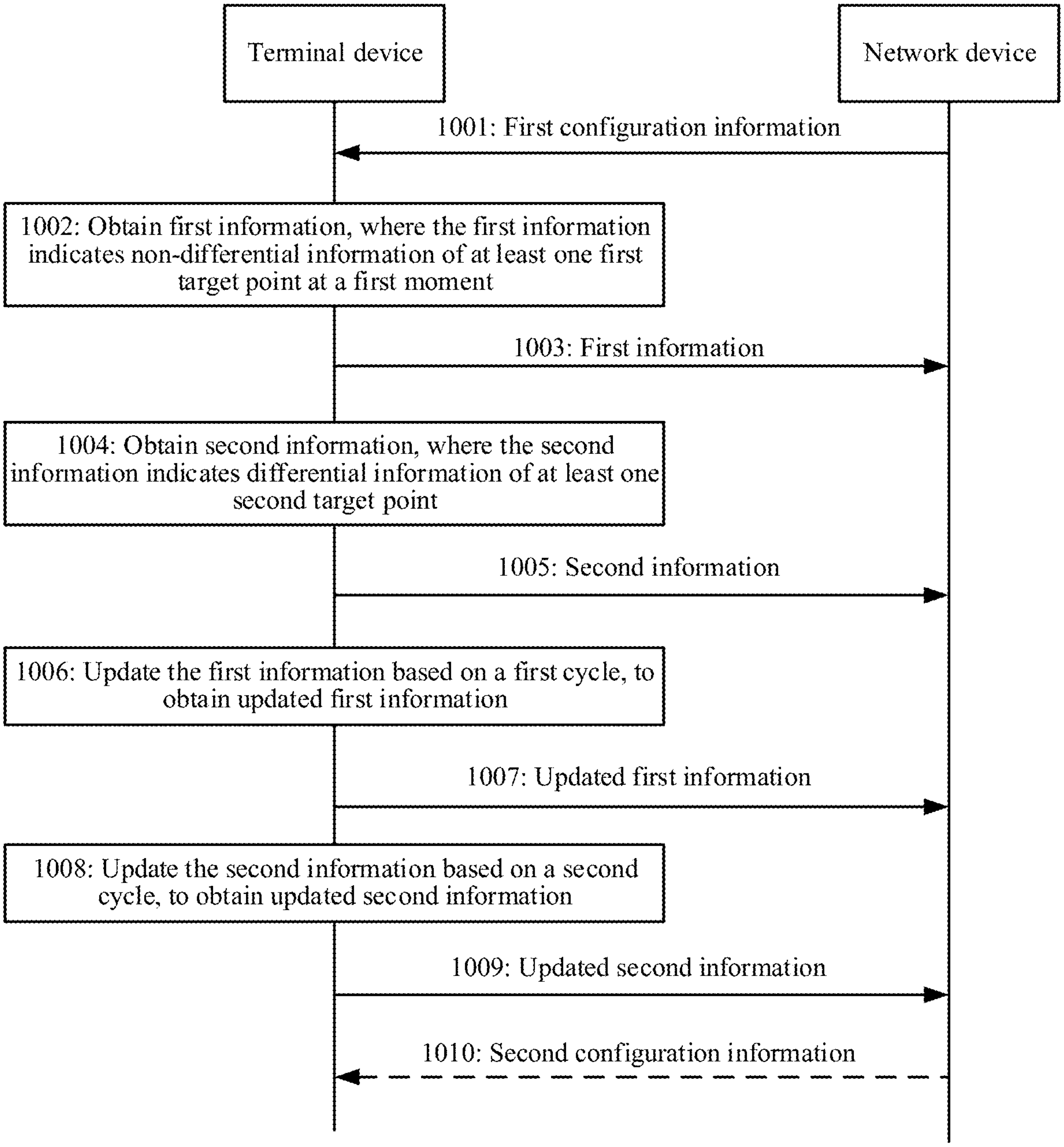
FIG. 10 is a schematic of another embodiment of a communication method according to an embodiment of this application.

With reference to embodiments shown in FIG. 8 to FIG. 10, the following describes several possible implementations in which a network device schedules a terminal device to send first information and indicates the terminal device to send second information.

FIG. 8 is a schematic of another embodiment of a communication method according to an embodiment of this application. Refer to FIG. 8. The communication method includes the following steps.

801: A network device sends first indication information to a terminal device.

The first indication information indicates the terminal device to send first information.

For example, the first indication information occupies one bit, and indicates the terminal device to send an R frame to the network device.

Optionally, the first indication information further indicates a resource used by the terminal device to send the first information and a used first modulation and coding scheme (Modulation and Coding Scheme, MCS) that is used.

For example, the first indication information further indicates a resource position, a resource size, and an MCS for sending the first information by the terminal device.

802: The terminal device obtains the first information, where the first information indicates non-differential information of at least one first target point at a first moment.

Step 802 is similar to step 201 in the embodiment shown in FIG. 2. For details, refer to related descriptions of step 201 in the embodiment shown in FIG. 2.

It should be noted that first quantization accuracy in the first information indicates the non-differential information of the at least one first target point at the first moment. The first quantization accuracy may be pre-agreed or preconfigured. Alternatively, the terminal device adjusts, based on the resource size indicated by the first indication information and a quantity of first target points sensed at the first moment, the first quantization accuracy indicating non-differential information of each first target point. Alternatively, the network device may configure an initial resource, and the terminal device may select the first quantization accuracy based on the initial resource and a quantity of first target points sensed at the first moment. For the last two implementations, the terminal device further needs to report the first quantization accuracy. After the network device receives the first information, if the network device determines that the first quantization accuracy is excessively low, the network device may allocate more resources next time, so that the terminal device reports non-differential information of a target point by using higher quantization accuracy.

803: The terminal device sends the first information to the network device. Correspondingly, the network device receives the first information from the terminal device.

For example, the terminal device sends an R frame to the network device based on the first indication information, where the R frame includes the first information.

Optionally, the terminal device may determine, based on the first indication information, a resource for sending the first information, encode the first information by using the first MCS indicated by the first indication information, and then send the first information to the network device.

It should be noted that, optionally, before the terminal device sends the first information, the terminal device may send a first resource application request to the network device. The first resource application request includes a quantity that is of target points included in the at least one first target point and that the terminal device expects to report. The network device may allocate a resource to the terminal device based on the first resource application request, and send a first resource application response to the terminal device. The first resource application response includes the resource that is allocated by the network device to the terminal device and that is for sending the first information. The terminal device sends the first information to the network device by using the resource.

804: The network device sends the second indication information to the terminal device. Correspondingly, the terminal device receives the second indication information from the network device.

The second indication information indicates the terminal device to send second information and/or fifth information.

For example, the second indication information occupies one bit, and indicates the terminal device to send a P frame to the network device.

Optionally, the second indication information further indicates a resource used by the terminal device to send the second information and/or the fifth information and a second MCS that is used.

For example, the second indication information indicates a resource position, a resource size, and the like for sending the second information and/or the fifth information by the terminal device.

805: The terminal device obtains the second information, where the second information indicates differential information of at least one second target point.

Step 805 is similar to step 203 in the embodiment shown in FIG. 2. For details, refer to related descriptions of step 203 in the embodiment shown in FIG. 2.

It should be noted that second quantization accuracy in the second information indicates differential information of the at least one second target point at a second moment. The second quantization accuracy may be pre-agreed or preconfigured. Alternatively, the terminal device adjusts, based on the resource size indicated by the second indication information and a quantity of second target points sensed at the second moment, the second quantization accuracy indicating differential information of each second target point. Alternatively, the network device may configure an initial resource, and the terminal device may select the second quantization accuracy based on the initial resource and a quantity of second target points sensed at the second moment. For the last two implementations, the terminal device further needs to report the second quantization accuracy.

After the network device receives the second information, if the network device determines that the second quantization accuracy is excessively low, the network device may allocate more resources next time, so that the terminal device reports differential information of a target point by using higher quantization accuracy.

It should be noted that, optionally, the network device may adjust, based on a resource shortage status of a communication system, a resource for sending differential information of a target point or non-differential information of a target point.

806: The terminal device sends the second information to the network device. Correspondingly, the network device receives the second information from the terminal device.

For example, the terminal device sends a P frame to the network device, where the P frame includes the second information.

Optionally, the terminal device may determine, based on the second indication information, a resource for sending the second information, encode the second information by using the second MCS indicated by the second indication information, and then send the second information to the network device.

It should be noted that, optionally, before the terminal device sends the second information, the terminal device may send a second resource application request to the network device. The second resource application request includes a quantity that is of target points included in the at least one second target point and that the terminal device expects to report. The network device may allocate a resource to the terminal device based on the second resource application request, and send a second resource application response to the terminal device. The second resource application response includes the resource that is allocated by the network device to the terminal device and that is for sending the second information. The terminal device sends the second information to the network device by using the resource.

Optionally, the embodiment shown in FIG. 8 further includes step 806*a*.

806*a*: The terminal device sends the fifth information to the network device, where the fifth information indicates non-differential information of at least one third target point at the second moment. Correspondingly, the network device receives the fifth information from the terminal device.

Step 806*a* is similar to step 204*b* in the embodiment shown in FIG. 2. For details, refer to related descriptions of step 204*b* in the embodiment shown in FIG. 2.

Optionally, if the terminal device fails in receiving the second information (for example, the second information is lost) or fails in decoding the second information, the embodiment shown in FIG. 8 further includes step 807. Step 807 may be performed after step 806.

807: The network device sends the third indication information to the terminal device. Correspondingly, the terminal device receives the third indication information from the network device.

The third indication information indicates the terminal device to send tenth information. The tenth information indicates non-differential information of at least one fourth target point at a third moment. The at least one fourth target point is a target point sensed by the terminal device at the third moment.

For example, the third indication information occupies one bit, and indicates the terminal device to send an R frame to the network device.

Specifically, the network device indicates the terminal device to perform reporting at the third moment (which may be understood as a next moment of the second moment) by using the R frame, that is, report the non-differential information of the at least one fourth target point at the third moment. In other words, once a packet loss occurs on the second information or the second information fails to be decoded, the process rolls back to sending an R frame. Therefore, a probability that the network device incorrectly parses differential information subsequently reported by the terminal device due to a failure in decoding the second information by the network device or a packet loss of the second information is effectively reduced, and an error propagation effect is avoided. For example, the network device fails in parsing the second information. If the terminal device further sends differential information of the at least one fourth target point by using a P frame, differential information of the at least one fourth target point at the third moment is determined based on non-differential information of the at least one second target point at the second moment and the non-differential information of the at least one fourth target point at the third moment, and the network device cannot obtain the non-differential information of the at least one second target point at the second moment through parsing, the network device cannot parse the P frame to obtain the non-differential information of the at least one fourth target point at the third moment.

The third indication information is similar to the first indication information. For details, refer to the foregoing related descriptions of the first indication information.

808: The terminal device obtains the tenth information, where the tenth information indicates the non-differential information of the at least one fourth target point at the third moment.

809: The terminal device sends the tenth information to the network device. Correspondingly, the network device receives the tenth information from the terminal device.

Step 808 and step 809 are similar to step 802 and step 803. For details, refer to related descriptions of step 802 and step 803. Details are not described herein again.

It should be noted that, if the network device successfully receives the tenth information, the network device may further indicate the terminal device to send a P frame. A specific process is similar to the process of steps 804 to 806. For details, refer to the foregoing related descriptions.

In the embodiment shown in FIG. 8, the network device schedules, in a dynamic scheduling manner, the terminal device to report differential information, and the terminal device reports non-differential information based on an indication of the network device, thereby reducing an amount of data reported and reducing signaling overheads. In addition, when a data packet loss or decoding failure occurs, the network device indicates the terminal device to send non-differential information. In this way, incorrect parsing and propagation effects of the network device caused by a data packet loss or decoding failure of the network device are effectively reduced.

FIG. 9 is a schematic of another embodiment of a communication method according to an embodiment of this application. Refer to FIG. 9. The communication method includes the following steps.

901: A network device sends first indication information to a terminal device.

Correspondingly, the terminal device receives the first indication information from the network device.

Step 901 is similar to step 801 in the embodiment shown in FIG. 8. For details, refer to related descriptions of step 801 in the embodiment shown in FIG. 8. Details are not described herein again.

902: The terminal device obtains first information, where the first information indicates non-differential information of at least one first target point at a first moment, and the first information includes a first flag bit.

The first information is similar to the first information in step 802 in the embodiment shown in FIG. 8. For details, refer to the foregoing related descriptions.

Specifically, the first information includes the first flag bit, and the first flag bit may occupy 1 bit. For example, a value of the first flag bit is 0.

903: The terminal device sends the first information to the network device.

904: The network device sends second indication information to the terminal device, where the second indication information includes a second flag bit, and a value of a second identifier is the same as a value of the first flag bit.

Step 903 and step 904 are similar to step 803 and step 804 in the embodiment shown in FIG. 8. For details, refer to related descriptions of step 803 and step 804 in the embodiment shown in FIG. 8.

If the network device successfully receives the first information, and the value of the second flag bit is the same as the value of the first flag bit, the terminal device may determine, based on the value of the second flag bit, that the network device successfully receives the first information.

For example, if the value of the first flag bit in the first information is 0, and the network device successfully receives the first information, the value of the second flag bit may also be 0, to indicate that the network device successfully receives the first information.

905: The terminal device obtains second information, where the second information indicates differential information of at least one second target point, and the second information includes a third flag bit.

Optionally, a value of the third flag bit may be obtained by flipping the value of the first flag bit. For example, the third flag bit occupies one bit, and the value of the third flag bit is 1.

906: The terminal device sends the second information to the network device.

Step 905 and step 906 are similar to step 805 and step 806 in the embodiment shown in FIG. 8. For details, refer to related descriptions of step 805 and step 806 in the embodiment shown in FIG. 8.

Optionally, the embodiment shown in FIG. 9 further includes step 906*a*.

906*a*: The terminal device sends fifth information to the network device, where the fifth information indicates non-differential information of at least one third target point at a second moment. Correspondingly, the network device receives the fifth information from the terminal device.

Step 906*a* is similar to step 204*b* in the embodiment shown in FIG. 2. For details, refer to related descriptions of step 204*b* in the embodiment shown in FIG. 2.

Optionally, if the network device fails in receiving the second information or fails in decoding the second information, the embodiment shown in FIG. 9 further includes step 907 to step 909. Step 907 to step 909 may be performed after step 906.

907: The network device sends fourth indication information to the terminal device, where the fourth indication information includes a fourth flag bit.

The fourth indication information indicates the terminal device to send eleventh information, where the eleventh information indicates differential information of at least one fourth target point at a third moment. The differential information of the at least one fourth target point at the third moment is determined based on the non-differential information of the at least one first target point at the first moment and non-differential information of the at least one fourth target point at the third moment.

Because the network device fails in receiving the second information or fails in decoding the second information, a value of the fourth flag bit is different from the value of the third flag bit. The value of the fourth flag bit indicates that the network device fails in receiving the second information or fails in decoding the second information. For example, the fourth flag bit occupies one bit, and the value of the fourth flag bit is 0.

908: The terminal device obtains eleventh information, where the eleventh information indicates differential information of the at least one fourth target point, and the eleventh information includes a fifth flag bit.

Specifically, the terminal device determines, based on the fourth flag bit, that the network device fails in receiving the second information or fails in decoding the second information, and determines, based on the second flag bit in the second indication information, that the network device successfully receives the first information. Therefore, the terminal device may determine the differential information of the at least one fourth target point based on the first information (the non-differential information of the at least one first target point at the first moment) and the non-differential information of the at least one fourth target point at the third moment. That is, the non-differential information of the at least one first target point is used as reference non-differential information. A value of the fifth flag bit may be 1.

909: The terminal device sends the eleventh information to the network device. Correspondingly, the network device receives the eleventh information from the terminal device.

If the network device successfully receives the eleventh information, the network device may continue to indicate the terminal device to send fifth indication information, where the fifth indication information indicates the terminal device to send differential information of at least one fifth target point, the fifth indication information includes a sixth flag bit, and a value of the sixth flag bit is the same as the value of the fifth flag bit. The at least one fifth target point is a target point sensed by the terminal device at a fourth moment. The differential information of the at least one fifth target point is determined based on non-differential information of the at least one fifth target point at the fourth moment and non-differential information of the at least one fourth target point at the third moment.

If the network device fails in receiving the eleventh information or fails in decoding the eleventh information, the network device may send the fifth indication information, where the fifth indication information indicates the terminal device to send differential information of at least one fifth target point, the fifth indication information includes a sixth flag bit, and a value of the sixth flag bit is different from the value of the fifth flag bit. The at least one fifth target point is a target point sensed by the terminal device at the fourth moment. The differential information of the at least one fifth target point is determined based on non-differential information of the at least one fifth target point at the fourth moment and the non-differential information of the at least one first target point at the first moment.

In the technical solution of the embodiment shown in FIG. 9, the terminal device includes a flag bit in information fed back to the network device. The network device receives the information fed back by the terminal device. The network device adds a flag bit to the indication information based on an information receiving status of the network device, and indicates the information receiving status of the network device to the terminal device by using a value of the flag bit. In this way, the terminal device can determine a status of receiving information by the network device. This helps the terminal device select appropriate differential information or non-differential information as reference non-differential information of to-be-reported differential information. In other words, the terminal device may continue to send a P frame, and does not need to frequently roll back to an R frame, thereby further reducing an amount of reported data and reducing signaling overheads.

The embodiment shown in FIG. 9 is merely an example. In principle, each time after the terminal device reports information, feedback for the information is added on a network device side. For example, the network device feeds back an acknowledgment (acknowledgement, ACK) or a negative acknowledgment (non-acknowledgement, NACK) to the terminal device for the information, to indicate a status of receiving the information by the network device. For example, if the network device feeds back an ACK to the terminal device for the information, it indicates that the network device successfully receives the information. Alternatively, if the network device feeds back a NACK to the terminal device for the information, it indicates that the network device fails in receiving the information. In this case, the terminal device may use, as reference information, differential information or non-differential information that is successfully received by the network device last time to determine differential information to be reported this time. After receiving the differential information, the network device parses the differential information also by using the differential information or the non-differential information that is successfully received by the network device last time as the reference information.

Optionally, time when the network device successfully receives the differential information or the non-differential information last time needs to fall within a time window. The time window may be configured by the network device for the terminal device by using radio resource control (radio resource control, RRC) signaling or a media access control control element (media access control control element, MAC CE). In this case, the terminal device needs to buffer only the differential information or the non-differential information in the time window. This helps reduce buffer pressure of the terminal device.

FIG. 10 is a schematic of another embodiment of a communication method according to an embodiment of this application. Refer to FIG. 10. The communication method includes the following steps.

1001: A network device sends first configuration information to a terminal device. Correspondingly, the terminal device receives the first configuration information from the network device.

The first configuration information indicates the terminal device to send, based on a first cycle and starting from a first moment, non-differential information of a target point sensed by the terminal device at different moments, and send, based on a second cycle and starting from a second moment, differential information of the target point sensed by the terminal device at different moments. The second cycle is shorter than the first cycle.

Figure 11A:
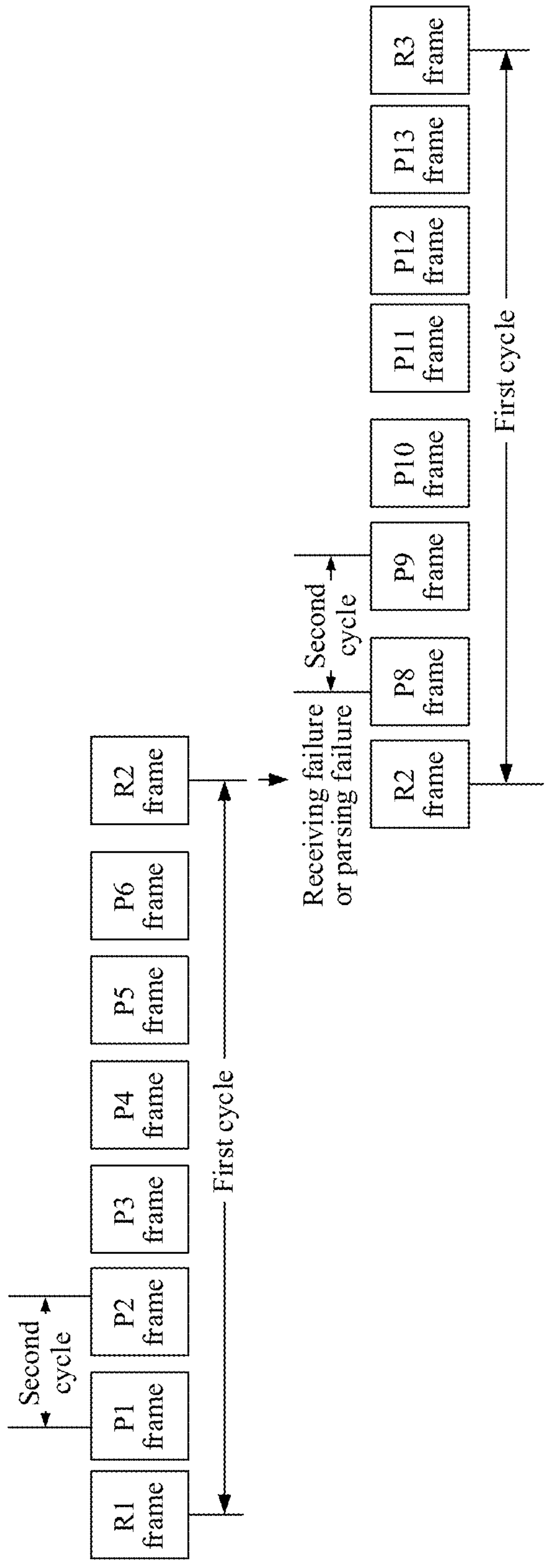
FIG. 11A is a schematic of semi-persistent scheduling in a communication method according to an embodiment of this application.

For example, as shown in FIG. 11A, the network device indicates, by using the first configuration information, the terminal device to send an R frame based on the first cycle and send a P frame based on the second cycle.

1002: The terminal device obtains first information, where the first information indicates non-differential information of at least one first target point at the first moment.

For the first information, refer to the foregoing related descriptions. Details are not described herein again.

1003: The terminal device sends the first information to the network device. Correspondingly, the network device receives the first information from the terminal device.

For example, as shown in FIG. 11A, the terminal device sends an R1 frame to the network device, where the R1 frame includes the first information.

1004: The network device obtains second information, where the second information indicates differential information of at least one second target point.

For the second information, refer to the foregoing related descriptions. Details are not described herein again.

1005: The terminal device sends the second information to the network device. Correspondingly, the network device receives the second information from the terminal device.

For example, as shown in FIG. 11A, the terminal device sends a P1 frame to the network device, where the P1 frame includes the second information.

1006: The terminal device updates the second information based on the second cycle, to obtain updated second information.

The updated second information includes differential information of at least one fourth target point at a third moment. The at least one fourth target point is a target point sensed by the terminal device at the third moment, and the differential information of the at least one fourth target point at the third moment is determined based on non-differential information of the at least one second target point and non-differential information of the at least one fourth target point at the third moment. A time difference between the third moment and the second moment is equal to the second cycle.

1007: The terminal device sends the updated second information to the network device. Correspondingly, the network device receives the updated second information from the terminal device.

For example, as shown in FIG. 11A, the terminal device sends a P2 frame to the network device, where the P2 frame includes the updated first information.

1008: The terminal device updates the first information based on the first cycle, to obtain updated first information.

The updated first information includes non-differential information of at least one sixth target point at a sixth moment. The at least one sixth target point is a target point sensed by the terminal device at the sixth moment. A time difference between the sixth moment and the first moment is equal to the first cycle.

1009: The terminal device sends the updated first information to the network device. Correspondingly, the network device receives the updated first information from the terminal device.

For example, as shown in FIG. 11A, the terminal device sends an R2 frame to the network device, where the R2 frame includes the updated first information.

The terminal device updates the second information based on the process of step 1006 and step 1007 in combination with the second cycle, and reports the updated second information. For example, as shown in FIG. 11A, the terminal device reports a P1 frame, a P2 frame, a P3 frame, a P4 frame, a P5 frame, and a P6 frame. The terminal device updates the first information based on the process of step 1008 and step 1009 in combination with the first cycle, and reports the updated first information. For example, as shown in FIG. 11A, the terminal device reports an R1 frame and an R2 frame.

It should be noted that, if the network device fails in receiving non-differential information of a target point sensed by the terminal device at a seventh moment, or the network device fails in receiving differential information of a target point sensed by the terminal device at an eighth moment, the network device may send configuration information to the terminal device again. Optionally, the embodiment shown in FIG. 10 further includes step 1010.

1010: The network device sends second configuration information to the terminal device. Correspondingly, the network device receives the second configuration information from the terminal device.

If the network device fails in receiving the non-differential information of the target point sensed by the terminal device at the seventh moment, the second configuration information indicates the terminal device to send, based on the first cycle and starting from the seventh moment, the non-differential information of the target point sensed by the terminal device at different moments, and send, based on the second cycle and starting from a ninth moment, the differential information of the target point sensed by the terminal device at different moments.

For example, the seventh moment is the sixth moment in step 1008, that is, the network device fails in receiving the updated first information. The network device may configure the terminal device to send again, based on the first cycle and starting from the sixth moment, the non-differential information of the target point sensed by the terminal device at different moments, and send, based on the second cycle and starting from the ninth moment, the differential information of the target point sensed by the terminal device at different moments. As shown in FIG. 11A, after the terminal device receives the second configuration information, the terminal device reports an R2 frame again. The R2 frame includes the non-differential information of the at least one sixth target point sensed by the terminal device at the sixth moment. Then, the terminal device sends a P8 frame to the network device, where the P8 frame includes differential information of a target point sensed by the terminal device at the ninth moment. The differential information of the target point sensed by the terminal device at the ninth moment is determined based on non-differential information of the target point sensed by the terminal device at the ninth moment and the non-differential information of the at least one sixth target point sensed by the terminal device at the sixth moment. Next, the terminal device sends a P9 frame, a P10 frame, a P11 frame, and the like to the network device based on the second cycle.

If the network device fails in receiving the differential information of the target point sensed by the terminal device at the eighth moment, the second configuration information indicates the terminal device to send, based on the first cycle and starting from the eighth moment, the non-differential information of the target point sensed by the terminal device at different moments, and send, based on the second cycle and starting from a tenth moment, the differential information of the target point sensed by the terminal device at different moments.

Figure 11B:
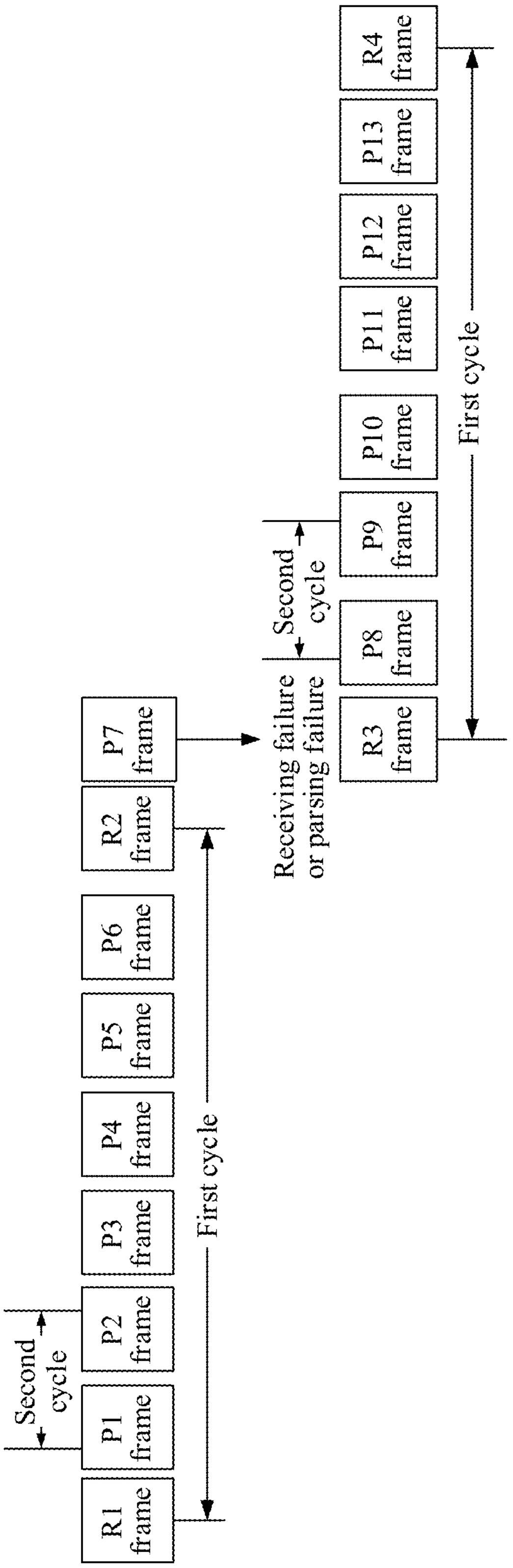
FIG. 11B is another schematic of semi-persistent scheduling in a communication method according to an embodiment of this application.

For example, as shown in FIG. 11B, the network device fails in receiving a P7 frame, and the network device may configure the terminal device to send again, based on the first cycle, the non-differential information of the target point sensed by the terminal device at different moments, and send, based on the second cycle, the differential information of the target point sensed by the terminal device at different moments. As shown in FIG. 11B, after the terminal device receives the second configuration information, the terminal device reports an R3 frame, where the R3 frame includes the non-differential information of the target point sensed by the terminal device at the eighth moment. Next, the terminal device reports a P8 frame, where the P8 frame includes differential information of the target point sensed by the terminal device at the tenth moment. The differential information of the target point sensed by the terminal device at the tenth moment is determined based on non-differential information of the target point sensed by the terminal device at the eighth moment and the non-differential information of the target point sensed by the terminal device at the tenth moment.

It should be noted that, in the embodiment shown in FIG. 10, the network device may allocate, to the terminal device in advance, a resource for reporting non-differential information or differential information. If the terminal device determines that the resource cannot carry differential information or non-differential information generated based on predetermined quantization accuracy, the terminal device may select a part of target points from target points sensed at this moment, and generate the corresponding differential information or non-differential information based on the predetermined quantization accuracy. Alternatively, the terminal device may select appropriate quantization accuracy based on the resource, and generate differential information or non-differential information based on the quantization accuracy. In this case, in addition to reporting the differential information or the non-differential information, the terminal device further needs to report the quantization accuracy.

In the embodiment shown in FIG. 10, the network device schedules, in a semi-persistent scheduling manner, the terminal device to report the differential information, and the terminal device reports, based on the first cycle, the non-differential information of the target point sensed by the terminal device at different moments, and reports, based on the second cycle, the non-differential information of the target point sensed by the terminal device at different moments. Therefore, an amount of data reported is reduced, and signaling overheads are reduced. When a data packet loss or decoding failure occurs, the network device may determine, based on an information receiving status, whether to interrupt a current differential information sending cycle, indicate again, by using signaling, the terminal device to resume sending of an R frame, and then enter a new differential information sending cycle, thereby avoiding a waste of transmission resources.

Figure 12:
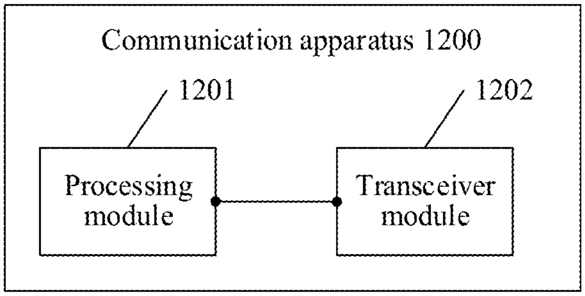
FIG. 12 is a schematic of a structure of a communication apparatus according to an embodiment of this application.

A communication apparatus provided in embodiments of this application is described below. Refer to FIG. 12. FIG. 12 is a schematic of a structure of a communication apparatus according to an embodiment of this application. The communication apparatus 1200 may be configured to perform steps performed by the terminal device in the embodiments shown in FIG. 2 and FIG. 8 to FIG. 10. For details, refer to related descriptions in the foregoing method embodiments.

The communication apparatus 1200 includes a processing module 1201 and a transceiver module 1202.

The transceiver module 1202 may implement a corresponding communication function, and the transceiver module 1202 may also be referred to as a communication interface or a communication unit. The processing module 1202 is configured to perform a processing operation.

Optionally, the communication apparatus 1200 may further include a storage module. The storage module may be configured to store instructions and/or data. The processing module 1201 may read the instructions and/or the data in the storage module, so that the communication apparatus implements the method embodiments shown in FIG. 2 and FIG. 8 to FIG. 10.

The communication apparatus 1200 may be configured to perform an action performed by the terminal device in the foregoing method embodiments. The communication apparatus 1200 may be a terminal device or a component that can be disposed in the terminal device. The transceiver module 1202 is configured to perform a receiving-related operation on a terminal device side in the foregoing method embodiments, and the processing module 1201 is configured to perform a processing-related operation on the terminal device side in the foregoing method embodiments.

Optionally, the transceiver module 1202 may include a sending module and a receiving module. The sending module is configured to perform a sending operation in the method embodiments shown in FIG. 2 and FIG. 8 to FIG. 10. The receiving module is configured to perform a receiving operation in the method embodiments shown in FIG. 2 and FIG. 8 to FIG. 10.

It should be noted that the communication apparatus 1200 may include a sending module, but does not include a receiving module. Alternatively, the communication apparatus 1200 may include a receiving module, but not include a sending module. This may be specifically determined depending on whether the foregoing solution performed by the communication apparatus 1200 includes a sending action and a receiving action.

The processing module is 1201 configured to obtain first information, where the first information indicates non-differential information of at least one first target point at a first moment, and the at least one first target point is a target point sensed by the communication apparatus 1200 at the first moment.

The transceiver module 1202 is configured to send the first information to a network device.

The processing module 1201 is further configured to obtain second information, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the communication apparatus 1200 at the second moment.

The transceiver module 1202 is further configured to send the second information to the network device.

In a possible implementation method, the transceiver module 1202 is further configured to:

send third information to the network device, where the third information indicates a quantity of target points included in the at least one second target point and indicates the first target point corresponding to each of the at least one second target point.

In another possible implementation, the third information is a bitmap, a quantity of bits included in the bitmap is equal to a quantity of the at least one first target point, and the bits in the bitmap are in one-to-one correspondence with the at least one first target point according to an indication sequence in which the first information indicates the non-differential information of the at least one first target point; and a bit whose value is 1 in the bitmap indicates that a first target point corresponding to the bit has a corresponding second target point, the second information indicates the differential information of the at least one second target point in a first sequence, and the first sequence is a sequence of second target points separately corresponding to first target points corresponding to bits whose values are 1 in the bitmap; or a bit whose value is 0 in the bitmap indicates that a first target point corresponding to the bit has a corresponding second target point, the second information indicates the differential information of the at least one second target point in a second sequence, and the second sequence is a sequence of second target points separately corresponding to first target points corresponding to bits whose values are 0 in the bitmap.

In another possible implementation, the transceiver module 1202 is further configured to:

send fourth information to the network device, where the fourth information indicates the quantity of target points included in the at least one first target point.

In another possible implementation, the differential information of the at least one second target point includes differential position information of each of the at least one second target point, and the differential position information of each of the at least one second target point includes a coordinate position difference between a coordinate position of the second target point at the second moment and a coordinate position, at the first moment, of the first target point corresponding to the second target point.

In another possible implementation, the transceiver module 1202 is further configured to:

send fifth information to the network device, where the fifth information indicates non-differential information of at least one third target point at the second moment, the at least one third target point is a target point sensed by the communication apparatus 1200 at the second moment, and the at least one third target point does not correspond to the at least one first target point.

In another possible implementation, the not corresponding includes:

the at least one third target point does not match the at least one first target point, and/or an absolute value of a differential value in differential information corresponding to the at least one third target point is greater than a first threshold.

In another possible implementation, the first moment and the second moment are a same moment.

In another possible implementation, the transceiver module 1202 is further configured to:

receive first indication information and/or second indication information from the network device, where the first indication information indicates the communication apparatus 1200 to send the first information, and the second indication information indicates the communication apparatus 1200 to send the second information and/or the fifth information.

In another possible implementation, the transceiver module 1202 is further configured to:

sending sixth information to the network device, where the sixth information indicates first quantization accuracy of the non-differential information of the at least one first target point.

In another possible implementation, the transceiver module 1202 is further configured to:

sending seventh information to the network device, where the seventh information indicates second quantization accuracy of the differential information of the at least one second target point.

In another possible implementation, the processing module 1201 is further configured to:

determine, according to a pairing algorithm, a target point that is paired with the first target point and a target point that is not paired with the first target point in the target point sensed by the communication apparatus 1200 at the second moment; and use, as the at least one second target point, a target point that is in the target point paired with the first target point and that corresponds to differential information in which an absolute value of a differential value is less than the first threshold, and use, as the at least one third target point, the target point that is not paired with the first target point and a target point that is in the target point paired with the first target point and that corresponds to differential information in which an absolute value of a differential value is greater than the first threshold.

In another possible implementation, the first information further includes a first flag bit, the second indication information further includes a second flag bit, a value of the first flag bit is the same as a value of the second flag bit, and the value of the second flag bit indicates that the network device successfully receives the first information.

In another possible implementation, if the network device fails in receiving the second information or fails in decoding the second information, the transceiver module 1202 is further configured to:

receive third indication information from the network device, where the third indication information indicates the communication apparatus 1200 to send tenth information, the tenth information indicates non-differential information of at least one fourth target point at a third moment, and the at least one fourth target point is a target point sensed by the communication apparatus 1200 at the third moment; and send the tenth information to the network device.

In another possible implementation, the second information further includes a third flag bit, and a value of the third flag bit is different from a value of the first flag bit.

If the network device fails in receiving the second information or fails in decoding the second information, the transceiver module 1202 is further configured to:

receive fourth indication information from the network device, where the fourth indication information includes a fourth flag bit, a value of the fourth flag bit is different from the value of the third flag bit, the value of the fourth flag bit indicates that the network device fails in receiving the second information or fails in decoding the second information, the fourth indication information indicates the communication apparatus 1200 to send eleventh information, the eleventh information indicates differential information of at least one fourth target point at a third moment, and the differential information of the at least one fourth target point at the third moment is determined based on the non-differential information of the at least one first target point at the first moment and non-differential information of the at least one fourth target point at the third moment; and send the eleventh information to the network device.

In another possible implementation, the transceiver module 1202 is further configured to:

receive first configuration information from the network device, where the first configuration information indicates the communication apparatus 1200 to send, based on a first cycle and starting from a first moment, non-differential information of a target point sensed by the communication apparatus 1200 at different moments, and send, based on a second cycle and starting from a second moment, differential information of the target point sensed by the communication apparatus 1200 at different moments. The second cycle is shorter than the first cycle.

The transceiver module 1202 is specifically configured to:

update the first information based on the first cycle, and send updated first information to the network device; and update the second information based on the second cycle, and send updated second information to the network device.

In this embodiment of this application, the processing module 1201 configured to obtain first information, where the first information indicates non-differential information of at least one first target point at a first moment, and the at least one first target point is a target point sensed by the communication apparatus 1200 at the first moment. The transceiver module 1202 is configured to send the first information to a network device. The processing module 1201 is further configured to obtain second information, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the communication apparatus 1200 at the second moment. The transceiver module 1202 is further configured to send the second information to the network device. It can be learned that the transceiver module 1202 reports the differential information of the at least one second target point to the network device, thereby reducing an amount of reported data, and reducing signaling overheads. In other words, this helps improve accuracy of the differential information reported by the communication apparatus when signaling overheads are fixed, thereby indirectly improving accuracy of obtaining the non-differential information of the at least one second target point by the network device.

Figure 13:
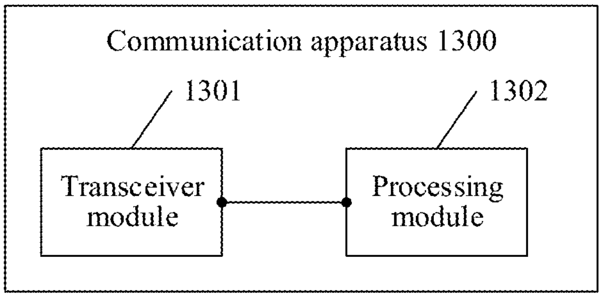
FIG. 13 is another schematic of a structure of a communication apparatus according to an embodiment of this application.

A communication apparatus provided in embodiments of this application is described below. Refer to FIG. 13. FIG. 13 is a schematic of a structure of a communication apparatus according to an embodiment of this application. The communication apparatus 1300 may be configured to perform steps performed by the network device in the embodiments shown in FIG. 2 and FIG. 8 to FIG. 10. For details, refer to related descriptions in the foregoing method embodiments.

The communication apparatus 1300 includes a transceiver module 1301 and a processing module 1302.

The transceiver module 1301 may implement a corresponding communication function, and the transceiver module 1301 may also be referred to as a communication interface or a communication unit. The processing module 1302 is configured to perform a processing operation.

Optionally, the communication apparatus 1300 may further include a storage module. The storage module may be configured to store instructions and/or data. The processing module 1302 may read the instructions and/or the data in the storage module, so that the communication apparatus implements the method embodiments shown in FIG. 2 and FIG. 8 to FIG. 10.

The communication apparatus 1300 may be configured to perform an action performed by the network device in the foregoing method embodiments. The communication apparatus 1300 may be a network device or a component that can be disposed in the network device. The transceiver module 1301 is configured to perform a receiving-related operation on a network device side in the foregoing method embodiments, and the processing module 1302 is configured to perform a processing-related operation on the network device side in the foregoing method embodiments.

Optionally, the transceiver module 1301 may include a sending module and a receiving module. The sending module is configured to perform a sending operation in the method embodiments shown in FIG. 2 and FIG. 8 to FIG. 10. The receiving module is configured to perform a receiving operation in the method embodiments shown in FIG. 2 and FIG. 8 to FIG. 10.

It should be noted that the communication apparatus 1300 may include a sending module, but does not include a receiving module. Alternatively, the communication apparatus 1300 may include a receiving module, but not include a sending module. This may be specifically determined depending on whether the foregoing solution performed by the communication apparatus 1300 includes a sending action and a receiving action.

The transceiver module 1301 is configured to: receive first information from a terminal device, where the first information indicates non-differential information of at least one first target point at a first moment, and the at least one first target point is a target point sensed by the terminal device at the first moment; and receive second information from the terminal device, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the terminal device at the second moment.

The processing module 1302 is configured to determine non-differential information of the at least one second target point at the second moment based on the first information and the second information.

In a possible implementation, the processing module 1302 is specifically configured to:

determine the non-differential information of the at least one first target point at the first moment based on the first information;

determine the differential information of the at least one second target point based on the second information; and determine the non-differential information of the at least one second target point at the second moment based on the non-differential information of the at least one first target point at the first moment and the differential information of the at least one second target point.

In another possible implementation, the transceiver module 1301 is further configured to:

receive third information from the terminal device, where the third information indicates a quantity of target points included in the at least one second target point and indicates the first target point corresponding to each of the at least one second target point.

The processing module 1302 is specifically configured to:

determine the non-differential information of the at least one second target point at the second moment based on the first information, the second information, and the third information.

In another possible implementation, the third information is a bitmap, a quantity of bits included in the bitmap is equal to a quantity of the at least one first target point, and the bits in the bitmap are in one-to-one correspondence with the at least one first target point according to an indication sequence in which the first information indicates the non-differential information of the at least one first target point; and a bit whose value is 1 in the bitmap indicates that a first target point corresponding to the bit has a corresponding second target point, the second information indicates the differential information of the at least one second target point in a first sequence, and the first sequence is a sequence of second target points separately corresponding to first target points corresponding to bits whose values are 1 in the bitmap; or a bit whose value is 0 in the bitmap indicates that a first target point corresponding to the bit has a corresponding second target point, the second information indicates the differential information of the at least one second target point in a second sequence, and the second sequence is a sequence of second target points separately corresponding to first target points corresponding to bits whose values are 0 in the bitmap.

In another possible implementation, the transceiver module 1301 is further configured to:

receive fourth information from the terminal device, where the fourth information indicates the quantity of target points included in the at least one first target point.

The processing module 1302 is specifically configured to:

determine the non-differential information of the at least one second target point at the second moment based on the first information, the second information, and the fourth information.

In another possible implementation, the differential information of the at least one second target point includes differential position information of each of the at least one second target point, and the differential position information of each of the at least one second target point includes a coordinate position difference between a coordinate position of the second target point at the second moment and a coordinate position, at the first moment, of the first target point corresponding to the second target.

In another possible implementation, the transceiver module 1301 is further configured to:

receive fifth information from the terminal device, where the fifth information indicates non-differential information of at least one third target point at the second moment, the at least one third target point is a target point sensed by the terminal device at the second moment, and the at least one third target point does not correspond to the at least one first target point.

In another possible implementation, the not corresponding includes:

the at least one third target point does not match the at least one first target point, and/or an absolute value of a differential value in differential information corresponding to the at least one third target point is greater than a first threshold.

In another possible implementation, the first moment and the second moment are a same moment.

In another possible implementation, the transceiver module 1301 is further configured to:

send first indication information and/or second indication information, where the first indication information indicates the terminal device to send the first information, and the second indication information indicates the terminal device to send the second information and/or the fifth information.

In another possible implementation, the transceiver module 1301 is further configured to:

receive sixth information from the terminal device, where the sixth information indicates first quantization accuracy of the non-differential information of the at least one first target point.

The processing module 1302 is specifically configured to:

determine the non-differential information of the at least one second target point at the second moment based on the first information, the second information, and the sixth information.

In another possible implementation, the transceiver module 1301 is further configured to:

receive seventh information from the terminal device, where the seventh information indicates second quantization accuracy of the differential information of the at least one second target point.

The processing module 1302 is specifically configured to:

determine the non-differential information of the at least one second target point at the second moment based on the first information, the second information, and the seventh information.

In another possible implementation, the first information further includes a first flag bit, the second indication information further includes a second flag bit, a value of the first flag bit is the same as a value of the second flag bit, and the value of the second flag bit indicates that the communication apparatus 1300 successfully receives the first information.

In another possible implementation, if the communication apparatus 1300 fails in receiving the second information or fails in decoding the second information, the transceiver module 1301 is further configured to:

send third indication information to the terminal device, where the third indication information indicates the terminal device to send tenth information, the tenth information indicates non-differential information of at least one fourth target point at a third moment, and the at least one fourth target point is a target point sensed by the terminal device at the third moment; and receive the tenth information from the terminal device.

In another possible implementation, the second information further includes a third flag bit, and a value of the third flag bit is different from a value of the first flag bit.

If the communication apparatus 1300 fails in receiving the second information or fails in decoding the second information, the transceiver module 1301 is further configured to:

send fourth indication information to the terminal device, where the fourth indication information includes a fourth flag bit, a value of the fourth flag bit is different from the value of the third flag bit, the value of the fourth flag bit indicates that the communication apparatus 1300 fails in receiving the second information or fails in decoding the second information, the fourth indication information indicates the terminal device to send eleventh information, the eleventh information indicates differential information of at least one fourth target point at a third moment, and the differential information of the at least one fourth target point at the third moment is determined based on the non-differential information of the at least one first target point at the first moment and non-differential information of the at least one fourth target point at the third moment; and receive the eleventh information from the terminal device.

In another possible implementation, the transceiver module 1301 is further configured to:

send first configuration information to the terminal device, where the first configuration information indicates the terminal device to send, based on a first cycle and starting from a first moment, non-differential information of a target point sensed by the terminal device at different moments, and send, based on a second cycle and starting from a second moment, differential information of the target point sensed by the terminal device at different moments. The second cycle is shorter than the first cycle.

In this embodiment of this application, the transceiver module 1301 is configured to: receive first information from a terminal device, where the first information indicates non-differential information of at least one first target point at a first moment, and the at least one first target point is a target point sensed by the terminal device at the first moment; and receive second information from the terminal device, where the second information indicates differential information of at least one second target point, each of the at least one second target point corresponds to one first target point, differential information of each of the at least one second target point is determined based on non-differential information of the second target point at a second moment and non-differential information, at the first moment, of the first target point corresponding to the second target point, and the at least one second target point is a target point sensed by the terminal device at the second moment. The processing module 1302 is configured to determine non-differential information of the at least one second target point at the second moment based on the first information and the second information. It can be learned that the solution in which the terminal device reports the differential information of the at least one second target point reduces an amount of reported data, and reduces signaling overheads. In other words, the terminal device reports the differential information of the at least one second target point to the network device, which helps improve accuracy of the differential information reported by the terminal device when signaling overheads are fixed, thereby indirectly improving accuracy of obtaining the non-differential information of the at least one second target point by the communication apparatus.

Figure 14:
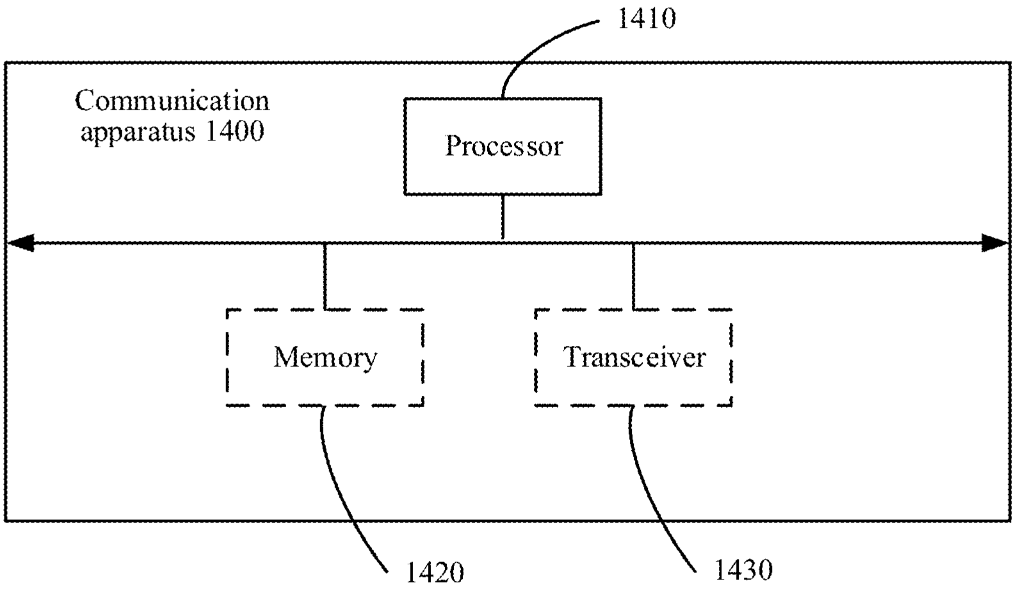
FIG. 14 is another schematic of a structure of a communication apparatus according to an embodiment of this application.

An embodiment of this application further provides a communication apparatus 1400. Refer to FIG. 14. The communication apparatus 1400 includes a processor 1410. The processor 1410 is coupled to a memory 1420. The memory 1420 is configured to store a computer program or instructions and/or data. The processor 1410 is configured to execute the computer program or the instructions and/or the data stored in the memory 1420, so that the method in the foregoing method embodiments is performed.

Optionally, the communication apparatus 1400 includes one or more processors 1410.

Optionally, as shown in FIG. 14, the communication apparatus 1400 may further include the memory 1420.

Optionally, the communication apparatus 1400 may include one or more memories 1420.

Optionally, the memory 1420 and the processor 1410 may be integrated together, or separately disposed.

Optionally, as shown in FIG. 14, the communication apparatus 1400 may further include a transceiver 1430. The transceiver 1430 is configured to receive and/or send a signal. For example, the processor 1410 is configured to control the transceiver 1430 to receive a signal and/or send a signal.

In a solution, the communication apparatus 1400 is configured to implement operations performed by the terminal device in the foregoing method embodiments.

For example, the processor 1410 is configured to implement processing-related operations performed by the terminal device in the foregoing method embodiments, and the transceiver 1430 is configured to implement sending-related and receiving-related operations performed by the terminal device in the foregoing method embodiments.

When the communication apparatus 1400 is a chip, the chip includes an input/output circuit and a communication interface. The processor is a processor, a microprocessor, or an integrated circuit integrated on the chip. The sending operation of the terminal device in the foregoing method embodiments may be understood as an output of the chip, and the receiving operation of the terminal device in the foregoing method embodiments may be understood as an input of the chip.

In a solution, the communication apparatus 1400 is configured to implement operations performed by the network device in the foregoing method embodiments.

For example, the processor 1410 is configured to implement processing-related operations performed by the network device in the foregoing method embodiments, and the transceiver 1430 is configured to implement sending-related and receiving-related operations performed by the network device in the foregoing method embodiments.

When the communication apparatus 1400 is a chip, the chip includes a transceiver, a memory, and a processor. The transceiver may be an input/output circuit or a communication interface. The processor is a processor, a microprocessor, or an integrated circuit integrated on the chip. The sending operation of the network device in the foregoing method embodiments may be understood as an output of the chip, and the receiving operation of the network device in the foregoing method embodiments may be understood as an input of the chip.

An embodiment of this application further provides a communication apparatus 1500. The communication apparatus 1500 may be a terminal device or a chip. The communication apparatus 1500 may be configured to perform operations performed by the terminal device in the foregoing method embodiments.

Figure 15:
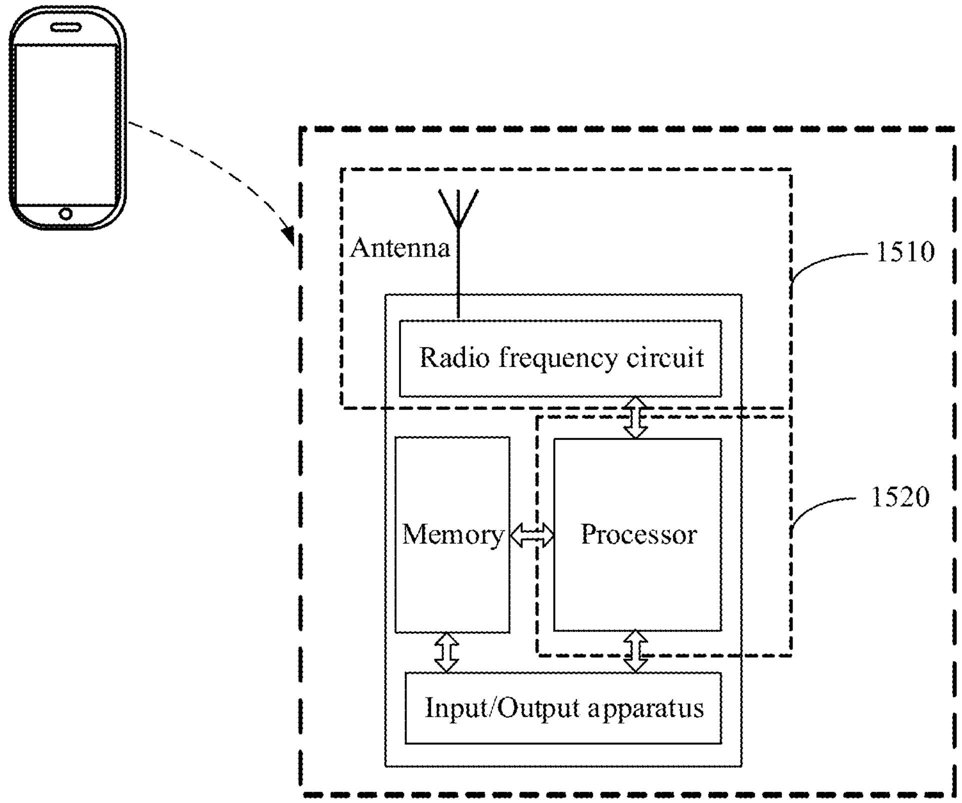
FIG. 15 is a schematic of a structure of a terminal device according to an embodiment of this application.

When the communication apparatus 1500 is a terminal device, FIG. 15 is a simplified schematic of a structure of the terminal device. For ease of understanding and illustration, an example in which the terminal device is a mobile phone is used in FIG. 15. As shown in FIG. 15, the terminal device includes a processor, a memory, a radio frequency circuit, an antenna, and an input/output apparatus.

The processor is mainly configured to: process a communication protocol and communication data, control the terminal device, execute a software program, process data of the software program, and the like.

The memory is mainly configured to store the software program and data. The radio frequency circuit is mainly configured to: perform conversion between a baseband signal and a radio frequency signal, and process the radio frequency signal.

The antenna is mainly configured to receive and send a radio frequency signal in a form of an electromagnetic wave.

The input/output apparatus, such as a touchscreen, a display, or a keyboard, is mainly configured to: receive data input by a user and output data to the user.

It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

For ease of description, FIG. 15 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have sending and receiving functions may be considered as a transceiver module of the terminal device, and the processor that has a processing function may be considered as a processing module of the terminal device. As shown in FIG. 15, the terminal device includes a transceiver module 1510 and a processing module 1520. The transceiver module may also be referred to as a transceiver, a transceiver machine, a transceiver apparatus, or the like. The processing module may also be referred to as a processor, a processing board, a processing module, a processing apparatus, or the like.

Optionally, a component for implementing a receiving function in the transceiver module 1510 may be considered as a receiving module, and a component for implementing a sending function in the transceiver module 1510 may be considered as a sending module. That is, the transceiver module 1510 includes the receiving module and the sending module. The transceiver module may also be sometimes referred to as a transceiver machine, a transceiver, a transceiver circuit, or the like. The receiving module may also be sometimes referred to as a receiver machine, a receiver, a receiver circuit, or the like. The sending module may also be sometimes referred to as a transmitter machine, a transmitter, a transmitter circuit, or the like.

It should be understood that the transceiver module 1510 is configured to perform a sending operation and a receiving operation of the terminal device in the foregoing method embodiments, and the processing module 1520 is configured to perform an operation other than the sending operation and the receiving operation of the terminal device in the foregoing method embodiments.

When the terminal device is a chip, the chip includes a transceiver module and a processing module. The transceiver module may be an input/output circuit or a communication interface. The processing module is a processor, a microprocessor, an integrated circuit, or a logic circuit integrated on the chip.

Figure 16:
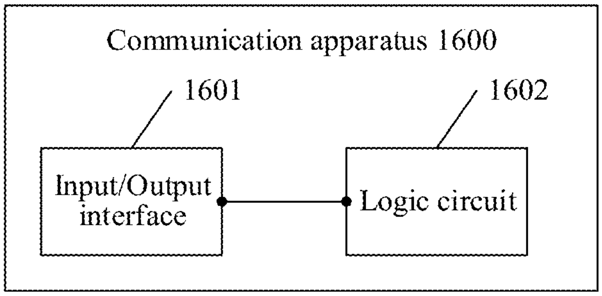
FIG. 16 is another schematic of a structure of a communication apparatus according to an embodiment of this application.

This application further provides another communication apparatus. Refer to FIG. 16. FIG. 16 is another schematic of a structure of a communication apparatus according to this application. The communication apparatus 1600 includes an input/output interface 1601 and a logic circuit 1602.

In a possible implementation, the communication apparatus 1600 may be configured to perform some or all of the steps performed by the terminal device in the embodiments shown in FIG. 2 and FIG. 8 to FIG. 10.

Optionally, the input/output interface 1601 may have a function of the transceiver module 1202 in the embodiment shown in FIG. 12. The logic circuit 1602 may have a function of the processing module 1201 in the embodiment shown in FIG. 12.

Optionally, the input/output interface 1601 may be configured to perform a sending or receiving operation performed by the terminal device in the foregoing communication method, and the logic circuit 1602 may be configured to perform a processing operation performed by the terminal device in the foregoing communication method.

Figure 17:
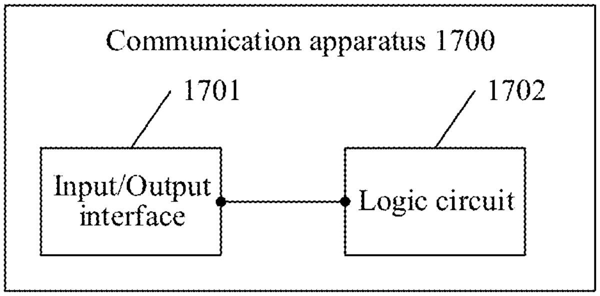
FIG. 17 is another schematic of a structure of a communication apparatus according to an embodiment of this application.

This application further provides another communication apparatus. Refer to FIG. 17. FIG. 17 is another schematic of a structure of a communication apparatus according to this application. The communication apparatus 1700 includes an input/output interface 1701 and a logic circuit 1702.

In a possible implementation, the communication apparatus 1700 may be configured to perform some or all of the steps performed by the network device in the embodiments shown in FIG. 2 and FIG. 8 to FIG. 10.

Optionally, the input/output interface 1701 may have a function of the transceiver module 1301 in the embodiment shown in FIG. 13. The logic circuit 1702 may have a function of the processing module 1302 in the embodiment shown in FIG. 13.

Optionally, the input/output interface 1701 may be configured to perform a sending or receiving operation performed by the network device in the foregoing communication method, and the logic circuit 1702 may be configured to perform a processing operation performed by the network device in the foregoing communication method.

An embodiment of this application further provides a computer-readable storage medium. The computer-readable storage medium stores computer instructions for implementing the method performed by the terminal device or the method performed by the network device in the foregoing method embodiments.

For example, when a computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the terminal device and the network device in the foregoing embodiments. The terminal device is configured to perform some or all of the steps performed by the terminal device in the embodiments shown in FIG. 2 and FIG. 8 to FIG. 10. The network device is configured to perform some or all of the steps performed by the network device in the embodiments shown in FIG. 2 and FIG. 8 to FIG. 10.

An embodiment of this application further provides a chip apparatus, including a processor, configured to invoke a computer degree or computer instructions stored in a memory, so that the processor performs the methods in the embodiments shown in FIG. 2 and FIG. 8 to FIG. 10.

In a possible implementation, an input of the chip apparatus corresponds to the receiving operation in the embodiments shown in FIG. 2 and FIG. 8 to FIG. 10, and an output of the chip apparatus corresponds to the sending operation in the embodiments shown in FIG. 2 and FIG. 8 to FIG. 10.

Optionally, the processor is coupled to the memory through an interface, or the processor is integrated with the memory.

Optionally, the chip apparatus further includes the memory, and the memory stores the computer degree or the computer instructions.

The processor mentioned anywhere above may be a general-purpose central processing unit, a microprocessor, an application-specific integrated circuit (application-specific integrated circuit, ASIC), or one or more integrated circuits configured to control program execution of the methods in the embodiments shown in FIG. 2 and FIG. 8 to FIG. 10. The memory mentioned in any place above may be a read-only memory (read-only memory, ROM), another type of static storage device that can store static information and instructions, a random access memory (random access memory, RAM), or the like.

It may be clearly understood by persons skilled in the art that, for the purpose of convenient and brief description, for a detailed working process of the foregoing system, apparatus, and module, refer to a corresponding process in the foregoing method embodiments. Details are not described herein again.

In several embodiments provided in this application, it should be understood that the disclosed system, apparatus, and method may be implemented in other manners. For example, the apparatus embodiment described above is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate components may or may not be physically separate, and components displayed as modules may or may not be physical modules, may be located in one position, or may be distributed on a plurality of network modules. Some or all the modules may be selected according to actual needs to achieve the objectives of the solutions of embodiments.

In addition, functional modules in this application may be integrated into one processing module, each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a USB flash disk, a removable hard disk, a read-only memory, a random access memory, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, wherein the method comprises:

obtaining, by a first communication apparatus, first information, wherein the first information indicates non-differential information of at least one first target point at a first moment, and each of the at least one first target point is a target point sensed by the first communication apparatus at the first moment;

sending, by the first communication apparatus, the first information;

obtaining, by the first communication apparatus, second information, wherein the second information indicates differential information of at least one second target point, each of the at least one second target point corresponds to a first target point in the at least one first target point, differential information of each of the at least one second target point is determined based on non-differential information of the second target point at a second moment and non-differential information of a corresponding first target point at the first moment, and each of the at least one second target point is a target point sensed by the first communication apparatus at the second moment; and sending, by the first communication apparatus, the second information.

2. The method according to claim 1, wherein the method further comprises:

sending, by the first communication apparatus, third information, wherein the third information indicates a quantity of target points comprised in the at least one second target point and indicates a first target point corresponding to each of the at least one second target point.

3. The method according to claim 2, wherein:

the third information is a bitmap, a quantity of bits comprised in the bitmap is equal to a quantity of the at least one first target point, and the bits in the bitmap are in one-to-one correspondence with the at least one first target point according to an indication sequence in which the first information indicates the non-differential information of the at least one first target point; and a bit whose value is 1 in the bitmap indicates that a first target point corresponding to the bit whose value is 1 has a corresponding second target point, the second information indicates the differential information of the at least one second target point in a first sequence, and the first sequence is a sequence of second target points respectively corresponding to first target points corresponding to bits whose values are 1 in the bitmap; or a bit whose value is 0 in the bitmap indicates that a first target point corresponding to the bit whose value is 0 has a corresponding second target point, the second information indicates the differential information of the at least one second target point in a second sequence, and the second sequence is a sequence of second target points respectively corresponding to first target points corresponding to bits whose values are 0 in the bitmap.

4. The method according to claim 3, wherein the method further comprises:

sending, by the first communication apparatus, fourth information, wherein the fourth information indicates the quantity of target points comprised in the at least one first target point.

5. The method according to claim 1, wherein:

the differential information of the at least one second target point comprises differential position information of each of the at least one second target point, and the differential position information of each of the at least one second target point comprises a coordinate position difference between a coordinate position of the second target point at the second moment and a coordinate position of a corresponding first target point at the first moment.

6. The method according to claim 1, wherein the method further comprises:

sending, by the first communication apparatus, fifth information, wherein the fifth information indicates non-differential information of at least one third target point at the second moment, each of the at least one third target point is a target point sensed by the first communication apparatus at the second moment, and the at least one third target point does not correspond to the at least one first target point.

7. The method according to claim 6, wherein that the at least one third target point does not correspond to the at least one first target point comprises at least one of the following:

the at least one third target point does not match the at least one first target point; or an absolute value of a differential value in differential information corresponding to the at least one third target point is greater than a first threshold.

8. The method according to claim 6, wherein the method further comprises:

receiving, by the first communication apparatus, at least one first indication information or second indication information, wherein the first indication information indicates to the first communication apparatus to send the first information, and the second indication information indicates to the first communication apparatus to send at least one of the second information or the fifth information.

9. The method according to claim 1, wherein the first moment and the second moment are a same moment.

10. A method, wherein the method comprises:

receiving, by a second communication apparatus, first information, wherein the first information indicates non-differential information of at least one first target point at a first moment, and each of the at least one first target point is a target point sensed by a terminal device at the first moment;

receiving, by the second communication apparatus, second information, wherein the second information indicates differential information of at least one second target point, each of the at least one second target point corresponds to a first target point in the at least one first target point, differential information of each of the at least one second target point is determined based on non-differential information of the second target point at a second moment and non-differential information of a corresponding first target point at the first moment, and each of the at least one second target point is a target point sensed by the terminal device at the second moment; and determining, by the second communication apparatus, non-differential information of the at least one second target point at the second moment based on the first information and the second information.

11. The method according to claim 10, wherein:

the method further comprises:

receiving, by the second communication apparatus, third information, wherein the third information indicates a quantity of target points comprised in the at least one second target point and indicates a first target point corresponding to each of the at least one second target point; and the determining, by the second communication apparatus, non-differential information of the at least one second target point at the second moment based on the first information and the second information comprises:

determining, by the second communication apparatus, the non-differential information of the at least one second target point at the second moment based on the first information, the second information, and the third information.

12. The method according to claim 11, wherein;

the third information is a bitmap, a quantity of bits comprised in the bitmap is equal to a quantity of the at least one first target point, and the bits in the bitmap are in one-to-one correspondence with the at least one first target point according to an indication sequence in which the first information indicates the non-differential information of the at least one first target point; and a bit whose value is 1 in the bitmap indicates that a first target point corresponding to the bit whose value is 1 has a corresponding second target point, and the second information indicates the differential information of the at least one second target point in a sequence of second target points respectively corresponding to first target points corresponding to bits whose values are 1 in the bitmap; or a bit whose value is 0 in the bitmap indicates that a first target point corresponding to the bit whose value is 0 has a corresponding second target point, and the second information indicates the differential information of the at least one second target point in a sequence of second target points respectively corresponding to first target points corresponding to bits whose values are 0 in the bitmap.

13. The method according to claim 10, wherein:

the method further comprises:

receiving, by the second communication apparatus, fourth information, wherein the fourth information indicates a quantity of target points comprised in the at least one first target point; and the determining, by the second communication apparatus, non-differential information of the at least one second target point at the second moment based on the first information and the second information comprises:

determining, by the second communication apparatus, the non-differential information of the at least one second target point at the second moment based on the first information, the second information, and the fourth information.

14. The method according to claim 10, wherein:

the differential information of the at least one second target point comprises differential position information of each of the at least one second target point, and the differential position information of each of the at least one second target point comprises a coordinate position difference between a coordinate position of the second target point at the second moment and a coordinate position of a corresponding first target point at the first moment.

15. The method according to claim 10, wherein the method further comprises:

receiving, by the second communication apparatus, fifth information, wherein the fifth information indicates non-differential information of at least one third target point at the second moment, each the at least one third target point is a target point sensed by the terminal device at the second moment, and the at least one third target point does not correspond to the at least one first target point.

16. The method according to claim 15, wherein that the at least one third target point does not correspond to the at least one first target point comprises at least one of the following:

the at least one third target point does not match the at least one first target point; or an absolute value of a differential value in differential information corresponding to the at least one third target point is greater than a first threshold.

17. The method according to claim 15, wherein the method further comprises:

sending, by the second communication apparatus, at least one first indication information or second indication information, wherein the first indication information indicates to the terminal device to send the first information, and the second indication information indicates to the terminal device to send at least one of the second information or the fifth information.

18. The method according to claim 10, wherein the first moment and the second moment are a same moment.

19. A communication apparatus, wherein the communication apparatus comprises:

at least one processor;

one or more memories coupled to the at least one processor and storing programming instructions for execution by the at least one processor to obtain first information, wherein the first information indicates non-differential information of at least one first target point at a first moment, and each of the at least one first target point is a target point sensed by the communication apparatus at the first moment; and a transceiver, configured to send the first information, wherein the one or more memories further store programming instructions for execution by the at least one processor to obtain second information, wherein the second information indicates differential information of at least one second target point, each of the at least one second target point corresponds to a first target point in the at least one first target point, differential information of each of the at least one second target point is determined based on non-differential information of the second target point at a second moment and non-differential information of a corresponding first target point at the first moment, and each of the at least one second target point is a target point sensed by the communication apparatus at the second moment; and the transceiver is further configured to send the second information.

20. The communication apparatus according to claim 19, wherein the transceiver is further configured to:

send third information, wherein the third information indicates a quantity of target points comprised in the at least one second target point and indicates a first target point corresponding to each of the at least one second target point.

* * * * *